United States Patent
Toyama et al.

(10) Patent No.: US 7,815,276 B2
(45) Date of Patent: *Oct. 19, 2010

(54) IMAGE FORMING METHOD AND APPARATUS

(75) Inventors: Hiroshi Toyama, Suwa (JP); Yujiro Nomura, Shiojiri (JP); Ken Ikuma, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 177 days.

This patent is subject to a terminal disclaimer.

(21) Appl. No.: 12/138,266

(22) Filed: Jun. 12, 2008

(65) Prior Publication Data

US 2008/0253808 A1   Oct. 16, 2008

Related U.S. Application Data

(63) Continuation of application No. 11/463,155, filed on Aug. 8, 2006, now Pat. No. 7,405,743.

(30) Foreign Application Priority Data

Aug. 30, 2005 (JP) .............................. 2005-249795
Aug. 30, 2005 (JP) .............................. 2005-249798

(51) Int. Cl.
*B41J 2/205* (2006.01)
(52) U.S. Cl. ........................................ 347/15; 358/1.2
(58) Field of Classification Search .................. 347/15, 347/43, 131, 231, 232, 243, 260, 118, 135, 347/236, 249, 253–4; 358/1.2, 1.9, 3.23, 358/3.13
See application file for complete search history.

(56) References Cited

U.S. PATENT DOCUMENTS

| | | | |
|---|---|---|---|
| 5,832,122 A | 11/1998 | Shimazaki | |
| 5,841,458 A | 11/1998 | Kroon | 347/131 |
| 7,405,743 B2 * | 7/2008 | Toyama et al. | 347/131 |

FOREIGN PATENT DOCUMENTS

| | | |
|---|---|---|
| JP | 08274991 A | 10/1996 |
| JP | 2000350026 A | 12/2000 |
| JP | 2002-182147 | 6/2002 |
| JP | 2006245674 A | 9/2006 |

* cited by examiner

*Primary Examiner*—Lamson D Nguyen
(74) *Attorney, Agent, or Firm*—Hogan Lovells US LLP

(57) ABSTRACT

An image forming method using an image forming apparatus including: a latent image carrier whose surface is driven in a sub scanning direction; a deflector which scans a beam spot reciprocally in a main scanning direction substantially perpendicular to the sub scanning direction on the surface of the latent image carrier in the use of an oscillating deflect mirror so as to form spot latent images each of which formed on a pixel; developer which develops each of the spot latent images as a pixel-dot, the method includes of: halftoning for a tone reproduction in which a halftone-dot constituted by the pixel-dot(s) is formed on a cell consisting plural pixels according to a fattening type threshold matrix, wherein a plurality of cells are contiguously arranged in the main scanning direction so as to form a plurality of contiguous locations at each of which the cells adjoin mutually in the main scanning direction, each cell includes a larger-than-four even number of pixels in the sub scanning direction, and the cells, which mutually adjoin at a particular contiguous location out of the plurality of contiguous locations, are mutually shifted by an odd number of pixel(s) in the sub scanning direction.

6 Claims, 34 Drawing Sheets

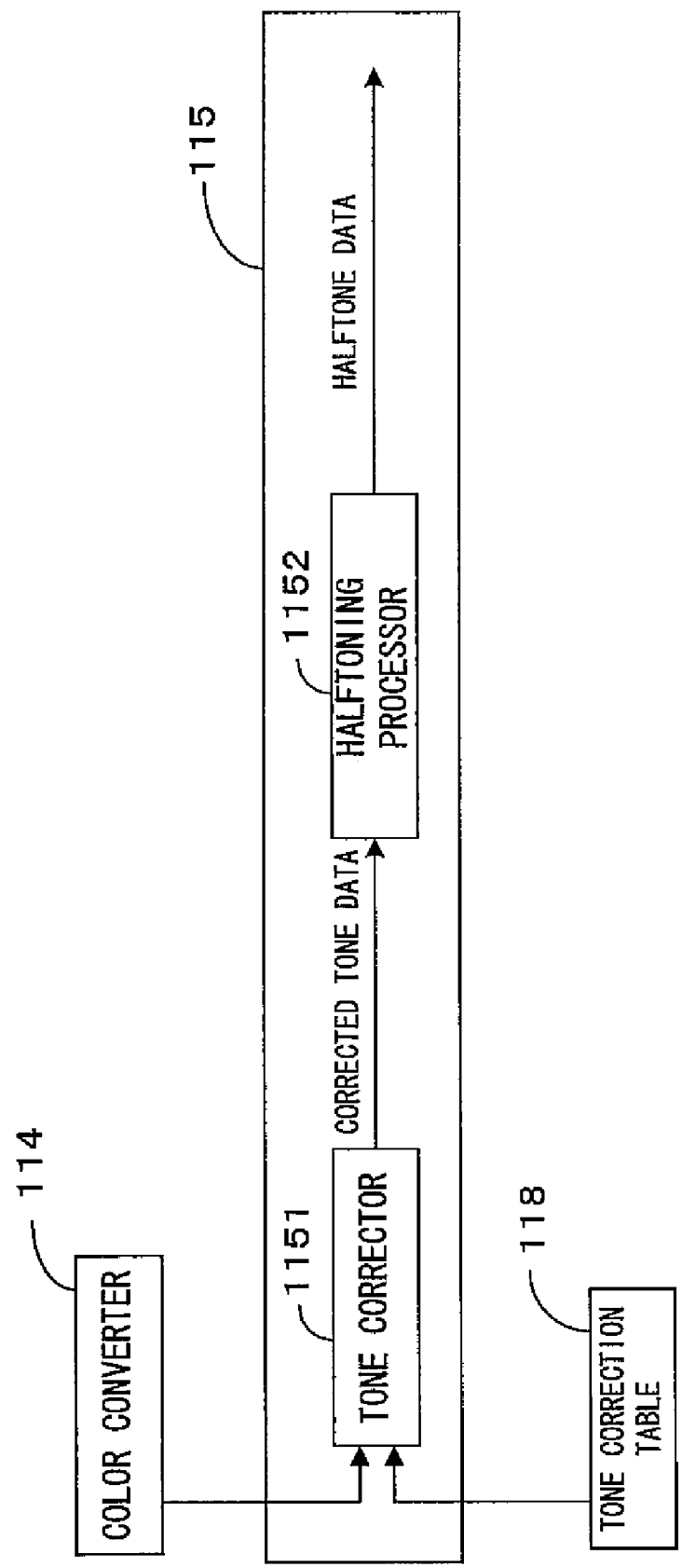

FIG. 6A: FORMING OF LINE LATENT IMAGE WITH LIGHT BEAM IN FIRST DIRECTION
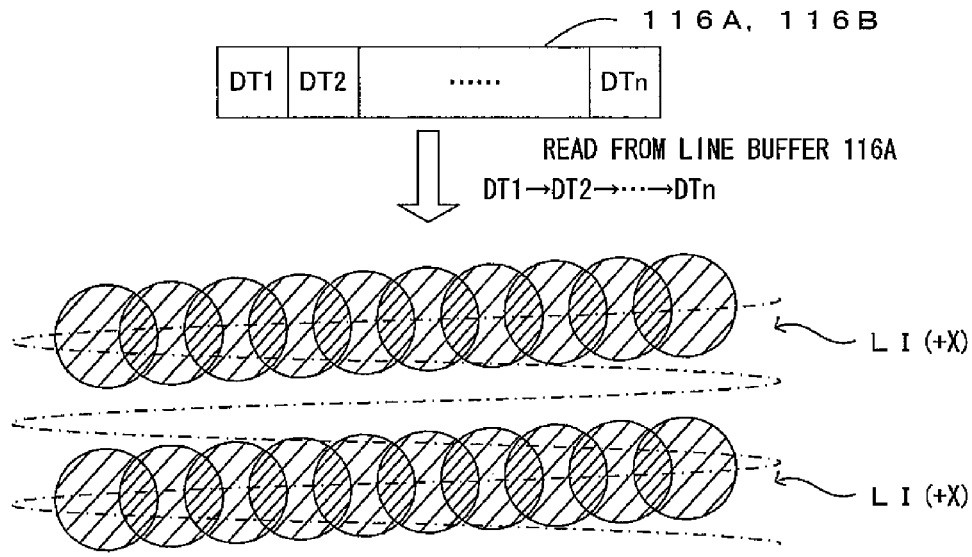
FIG. 6B: FORMING OF LINE LATENT IMAGE WITH LIGHT BEAM IN SECOND DIRECTION
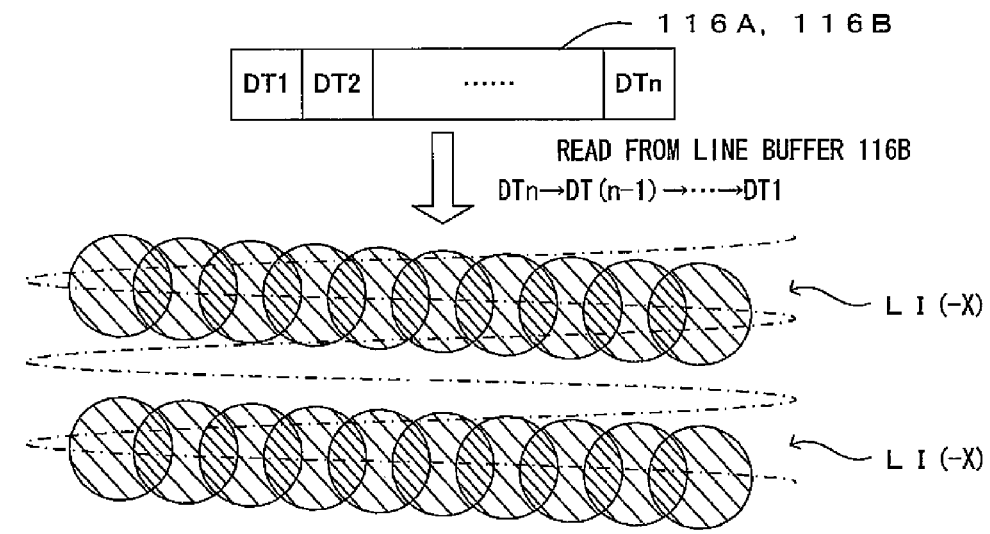
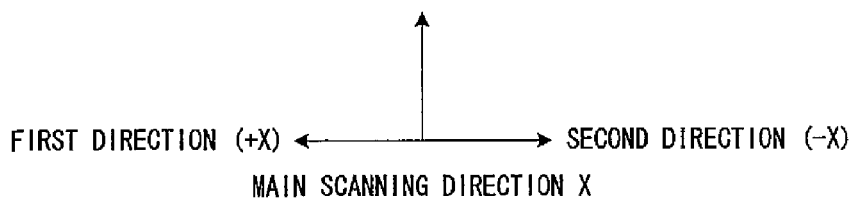

F I G. 7
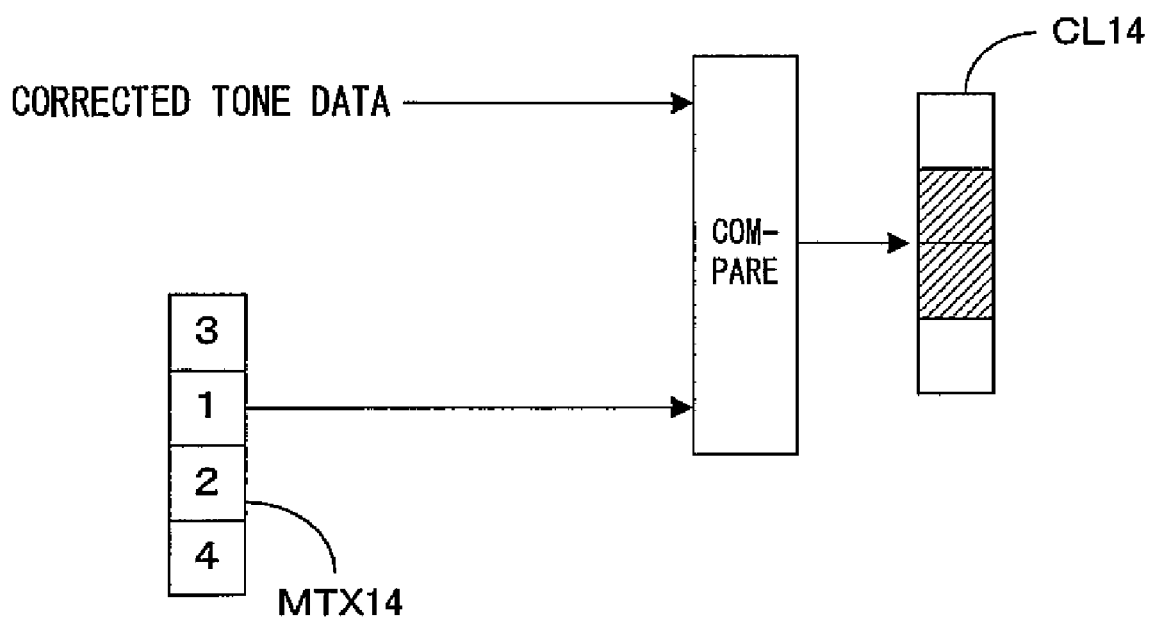

FIG. 8A    FIG. 8B
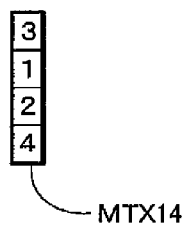
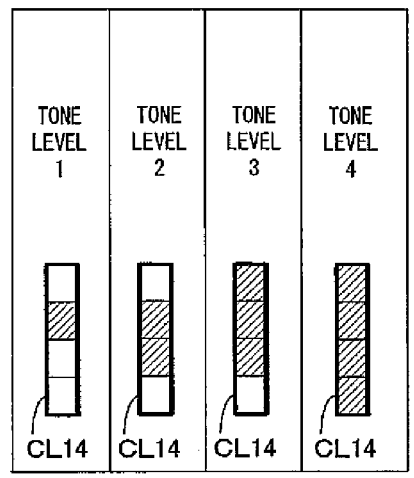
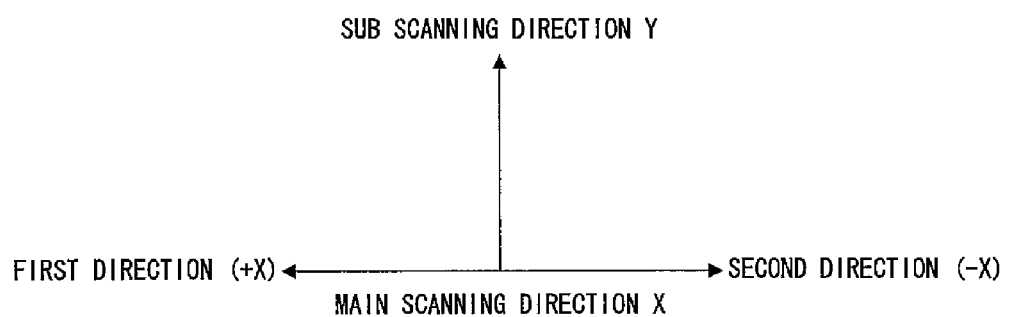

FIG. 11
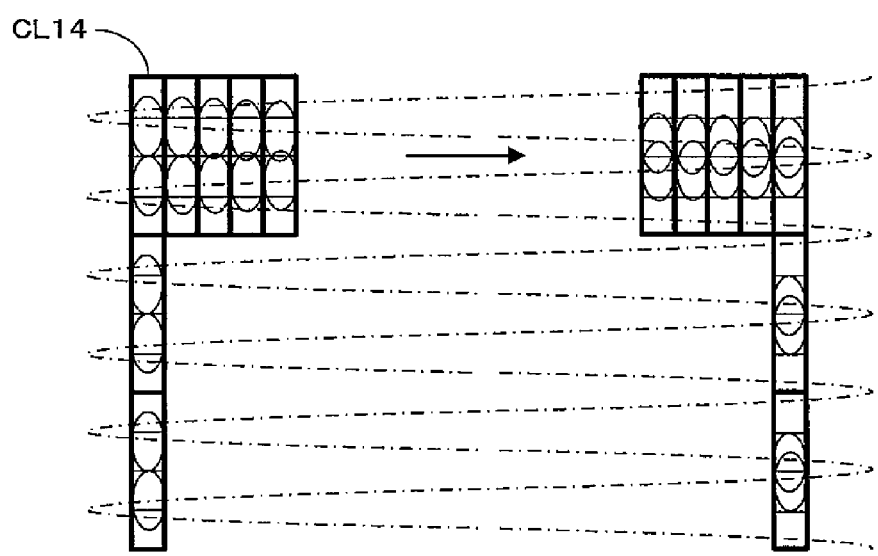
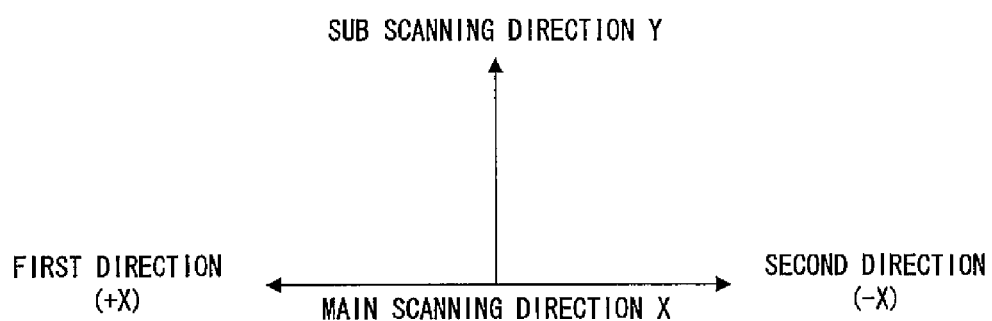

FIG. 16A
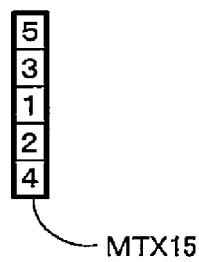
MTX15
FIG. 16B
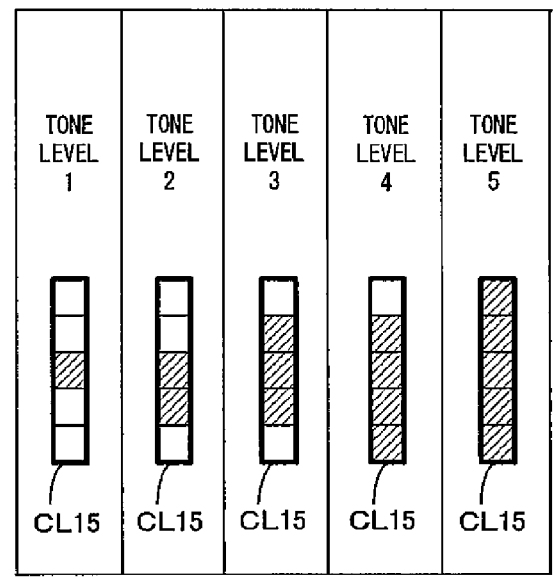
SUB SCANNING DIRECTION Y
FIRST DIRECTION (+X) ← MAIN SCANNING DIRECTION X → SECOND DIRECTION (-X)

FIG. 20A

| 14 | 10 | 6  | 15 |
|----|----|----|----|
| 5  | 1  | 2  | 11 |
| 9  | 4  | 3  | 7  |
| 13 | 8  | 12 | 16 |

— MTX44

FIG. 20B

| 46 | 42 | 38 | 26 | 22 | 35 | 43 | 47 |
|----|----|----|----|----|----|----|----|
| 34 | 30 | 17 | 14 | 10 | 18 | 31 | 39 |
| 21 | 9  | 5  | 1  | 2  | 7  | 15 | 27 |
| 25 | 13 | 8  | 4  | 3  | 6  | 11 | 23 |
| 37 | 29 | 20 | 12 | 16 | 19 | 32 | 36 |
| 45 | 41 | 33 | 24 | 28 | 40 | 44 | 48 |

— MTX86

FIG. 20C

| 62 | 58 | 46 | 34 | 30 | 44 | 56 | 63 |
|----|----|----|----|----|----|----|----|
| 55 | 51 | 38 | 22 | 18 | 26 | 52 | 59 |
| 43 | 25 | 14 | 10 | 6  | 15 | 39 | 47 |
| 29 | 17 | 5  | 1  | 2  | 11 | 23 | 35 |
| 33 | 21 | 9  | 4  | 3  | 7  | 19 | 31 |
| 45 | 37 | 13 | 8  | 12 | 16 | 27 | 41 |
| 57 | 50 | 28 | 20 | 24 | 40 | 49 | 53 |
| 61 | 54 | 42 | 32 | 36 | 48 | 60 | 64 |

— MTX88

F I G. 3 7
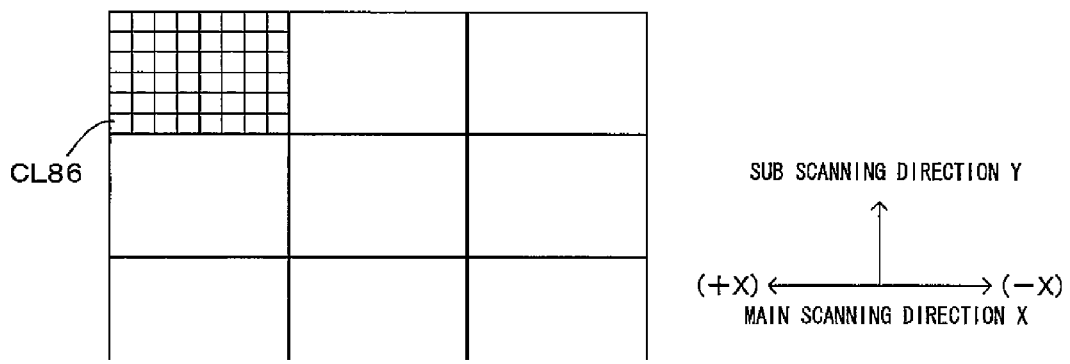
F I G. 3 8
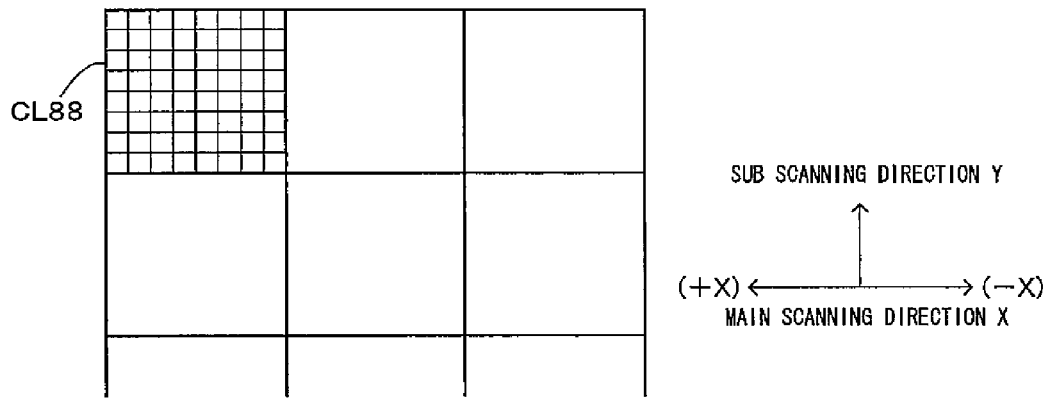

FIG. 39A

| 13 | 14 | 15 | 16 | 17 |
|----|----|----|----|----|
| 12 | 3  | 4  | 5  | 18 |
| 11 | 2  | 1  | 6  | 19 |
| 10 | 9  | 8  | 7  | 20 |
| 25 | 24 | 23 | 22 | 21 |

MTX55

FIG. 39B

| 46 | 39 | 25 | 26 | 27 | 40 | 47 |
|----|----|----|----|----|----|----|
| 38 | 24 | 12 | 13 | 14 | 28 | 41 |
| 23 | 11 | 3  | 4  | 5  | 15 | 29 |
| 22 | 10 | 2  | 1  | 6  | 16 | 30 |
| 37 | 21 | 9  | 8  | 7  | 17 | 31 |
| 45 | 36 | 20 | 19 | 18 | 32 | 42 |
| 49 | 44 | 35 | 34 | 33 | 43 | 48 |

MTX77

FIG. 39C

| 19 | 20 | 21 | 22 | 23 | 24 |
|----|----|----|----|----|----|
| 18 | 13 | 6  | 7  | 14 | 25 |
| 17 | 5  | 1  | 2  | 8  | 26 |
| 36 | 12 | 4  | 3  | 9  | 27 |
| 35 | 16 | 11 | 10 | 15 | 28 |
| 34 | 33 | 32 | 31 | 30 | 29 |

MTX66

SUB SCANNING DIRECTION Y

FIRST DIRECTION (+X) ← MAIN SCANNING DIRECTION X → SECOND DIRECTION (−X)

F I G. 4 5
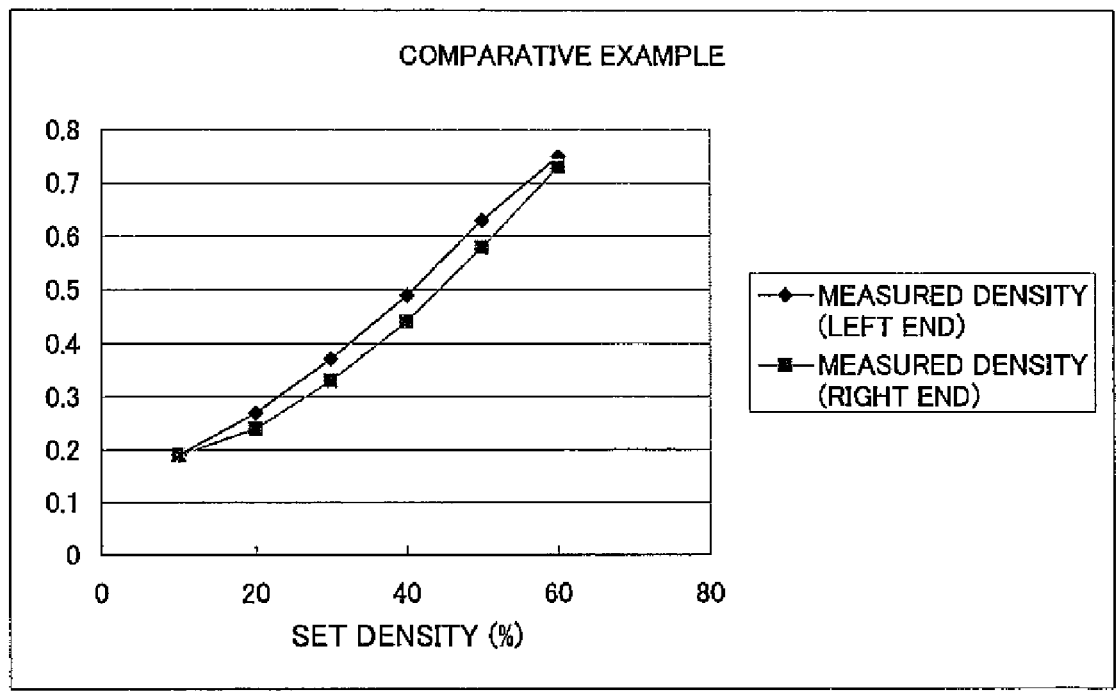

IMAGE FORMING METHOD AND APPARATUS

CROSS REFERENCE TO RELATED APPLICATION

This application is a continuation of application Ser. No. 11/463,155, filed on Aug. 8, 2006, the entire contents of which are incorporated by reference. The disclosure of Japanese Patent Applications enumerated below including specification, drawings and claims is also incorporated here in by reference in their entirety:

No. 2005-249795 filed Aug. 30, 2005; and
No. 2005-249798 filed Aug. 30, 2005.

BACKGROUND

1. Technical Field

The present invention relates to an image forming apparatus which forms an image by scanning a light beam on a surface of a latent image carrier in a main scanning direction substantially perpendicular to the sub scanning direction, the latent image carrier driven in a sub scanning direction. The invention also relates to an image forming method used in the apparatus.

2. Related Art

The image forming apparatus of this type includes the latent image carrier, an exposure unit and a developer unit and operates as follows to form a toner image on the latent image carrier. Specifically, a light source of the exposure unit is controlled based on image data representing the toner image. In the meantime, the exposure unit makes a deflector deflectively scan the light beam from the light source in the main scanning direction as focusing the light beam in a spot shape on the latent image carrier, whereby a latent image corresponding to the image data is formed on the surface of the latent image carrier. Then, the latent image is developed with toner to form the toner image.

JP A-2002-182147 proposes an art to use an oscillatory deflection mirror surface as the deflector in order to achieve the downsizing and high speed performance of the deflector. In this apparatus, the deflection mirror supported by a torsion bar is brought into oscillation, while the light beam emitted from the light source is reflected by the deflection mirror for reciprocally scanning the light beam on the surface of the latent image carrier.

SUMMARY

Such an image forming apparatus is adapted to scan the light beam from the light source on the latent image carrier in both of the forward and backward directions of the main scanning direction. However, the apparatus designed to scan the beam spot in both of the forward and backward directions by means of the deflection mirror encounters the following problem when tone is reproduced by using a fattening type threshold matrix. In the tone reproduction using the fattening type threshold matrix, plural pixels are used to form one cell. Out of the plural pixels belonging to the cell, only those which correspond to a tone level are subjected to light exposure and development for formation of pixel-dots according to the threshold matrix whereby the size of a halftone-dot constituted by such pixel-dots is varied according to the tone level. Thus, the tone is reproduced. Specifically, in the case of a low tone level, a small number of pixels are subjected to light exposure and development to form a small halftone-dot. In the case of a high tone level, a large number of pixels are subjected to light exposure and development to form a large halftone-dot. Therefore, the tone level to be reproduced is dependent upon the size of the halftone-dot.

In the aforementioned image forming apparatus, however, a scanning pitch in the sub scanning direction is inconstant because the light beam is scanned in the both directions of the main scanning direction as being focused in a spot shape on the surface of the latent image carrier. Hence, the beam spots scanned in the sub scanning direction are overlapped in various degrees. That is, the overlap of the beam spots in the sub scanning direction is increased at an area where the scanning pitch in the sub scanning direction is narrow. In contrast, the overlap of the beam spots in the sub scanning direction is decreased at an area where the scanning pitch in the sub scanning direction is wide. Even though halftone-dots corresponding to the same tone level are to be formed, the tone level is decreased at the area of the narrow scanning pitch because a small halftone-dot is formed, whereas the tone level is increased at the area of the wide scanning pitch because a large halftone-dot is formed. This may result in an image defect in a case where the fattening type threshold matrix is used. Specifically, the halftone-dots at opposite ends with respect to the main scanning direction have different densities although the halftone-dots of one tone level are to be formed. A detailed description will be made on this image defect hereinlater.

In view of the foregoing, the invention has been accomplished. An advantage of some aspects of the invention is to provide a technique for accomplishing a favorable tone reproduction by obviating the above image defect even when the image forming apparatus performs the tone reproduction using the fattening type threshold matrix, the image forming apparatus which forms the latent image on the surface of the latent image carrier, driven in the sub scanning direction, by irradiating the light beam spot thereon and reciprocally scanning the beam spot in the main scanning direction by means of the deflection mirror surface.

According to a first aspect of the invention, there is provided an image forming method using an image forming apparatus comprising: a latent image carrier whose surface is driven in a sub scanning direction; a deflector which scans a beam spot reciprocally in a main scanning direction substantially perpendicular to the sub scanning direction on the surface of the latent image carrier in the use of an oscillating deflect mirror so as to form spot latent images each of which formed on a pixel; developer which develops each of the spot latent images as a pixel-dot, the method comprising of: halftoning for a tone reproduction in which a halftone-dot constituted by the pixel-dot(s) is formed on a cell consisting plural pixels according to a fattening type threshold matrix, wherein a plurality of cells are contiguously arranged in the main scanning direction so as to form a plurality of contiguous locations at each of which the cells adjoin mutually in the main scanning direction, each cell includes a larger-than-four even number of pixels in the sub scanning direction, and the cells, which mutually adjoin at a particular contiguous location out of the plurality of contiguous locations, are mutually shifted by an odd number of pixel(s) in the sub scanning direction.

According to a second aspect of the invention, there is provided an image forming apparatus comprising: latent image carrier whose surface is driven in a sub scanning direction; a deflector which scans a beam spot reciprocally in a main scanning direction substantially perpendicular to the sub scanning direction on the surface of the latent image carrier in the use of an oscillating deflect mirror so as to form spot latent images, each of the spot latent images formed on a pixel; and developer which develops each of the spot latent images as a pixel-dot, wherein a halftone-dot constituted by the pixel-dot(s) is formed on a cell consisting plural pixels according to a fattening type threshold matrix for a tone reproduction, a plurality of cells are contiguously arranged in the main scanning direction so as to form a plurality of contiguous locations, at each of the contiguous locations the cells adjoining mutually in the main scanning direction, each cell includes a larger-than-four even number of pixels in the sub scanning direction, and the cells, which mutually adjoin at a particular contiguous location out of the plurality of contiguous locations, are mutually shifted by an odd number of pixel(s) in the sub scanning direction.

According to a third aspect of the invention, there is provided an image forming method using an image forming apparatus comprising: a latent image carrier whose surface is driven in a sub scanning direction; a deflector which scans a beam spot reciprocally in a main scanning direction substantially perpendicular to the sub scanning direction on the surface of the latent image carrier in the use of an oscillating deflect mirror so as to form spot latent images, each of the spot latent images formed on a pixel; developer which develops each of the spot latent images as a pixel-dot, the method comprising of: halftoning for a tone reproduction in which a halftone-dot constituted by the pixel-dot(s) is formed on a cell consisting plural pixels according to a fattening type threshold matrix, wherein a plurality of cells, each of which includes a larger-than-three odd number of pixels in the sub scanning direction, are contiguously arranged in the sub scanning direction.

According to a forth aspect of the invention, there is provided an image forming apparatus comprising: a latent image carrier whose surface is driven in a sub scanning direction; a deflector which scans a beam spot reciprocally in a main scanning direction substantially perpendicular to the sub scanning direction on the surface of the latent image carrier in the use of an oscillating deflect mirror so as to form spot latent images, each of the spot latent images formed on a pixel; and developer which develops each of the spot latent images as a pixel-dot, wherein a halftone-dot constituted by the pixel-dot(s) is formed on a cell consisting plural pixels according to a fattening type threshold matrix for a tone reproduction, and a plurality of cells, each of which includes a larger-than-three odd number of pixels in the sub scanning direction, are contiguously arranged in the sub scanning direction.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 5 is a diagram showing an arrangement of the image processor.

FIGS. 6A and 6B diagrams showing the formation of latent image with light beam in first or second direction.

FIG. 7 is a diagram showing the halftoning process performed by the halftoning processor.

FIGS. 8A and 8B are diagrams showing an operation of the 1×4 threshold matrix MTX14.

FIGS. 11 and 12 are diagrams for explaining the reason of the occurrence of the above image defect.

FIG. 16A is a diagram showing the 1×5 threshold matrix MTX15.

FIG. 16B is a diagram showing the growth of a halftone-dot in the 1×5 cell CL15 in a case where the 1×5 threshold matrix MTX15 is used.

FIGS. 20A, 20B and 20C show the threshold matrices used in the examples and comparative examples.

FIG. 37 is a diagram showing a cell arrangement used in Comparative Example 3.

FIG. 38 is a diagram showing a cell arrangement used in Comparative Example 4.

FIGS. 39A, 39B and FIG. 39C are diagrams showing threshold matrices corresponding to cells used in Examples 15, 16 and Comparative Example 5.

FIG. 45 is diagram graphically showing the results listed in Table 4.

DESCRIPTION OF EXEMPLARY EMBODIMENTS

First Embodiment

Arrangement of Apparatus

Figure 1:
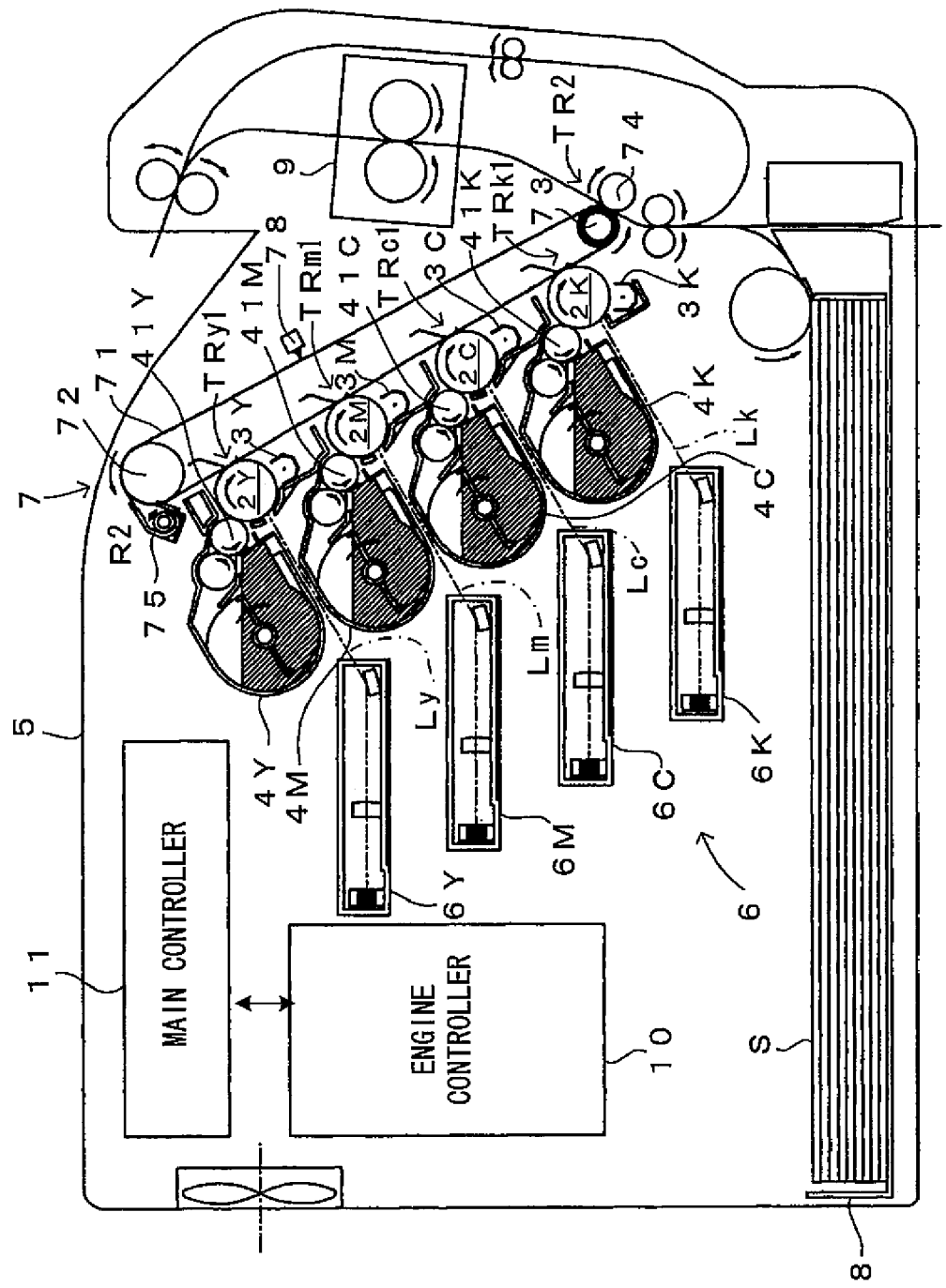
FIG. 1 is a diagram showing an image forming apparatus according to a first embodiment.
Figure 2:
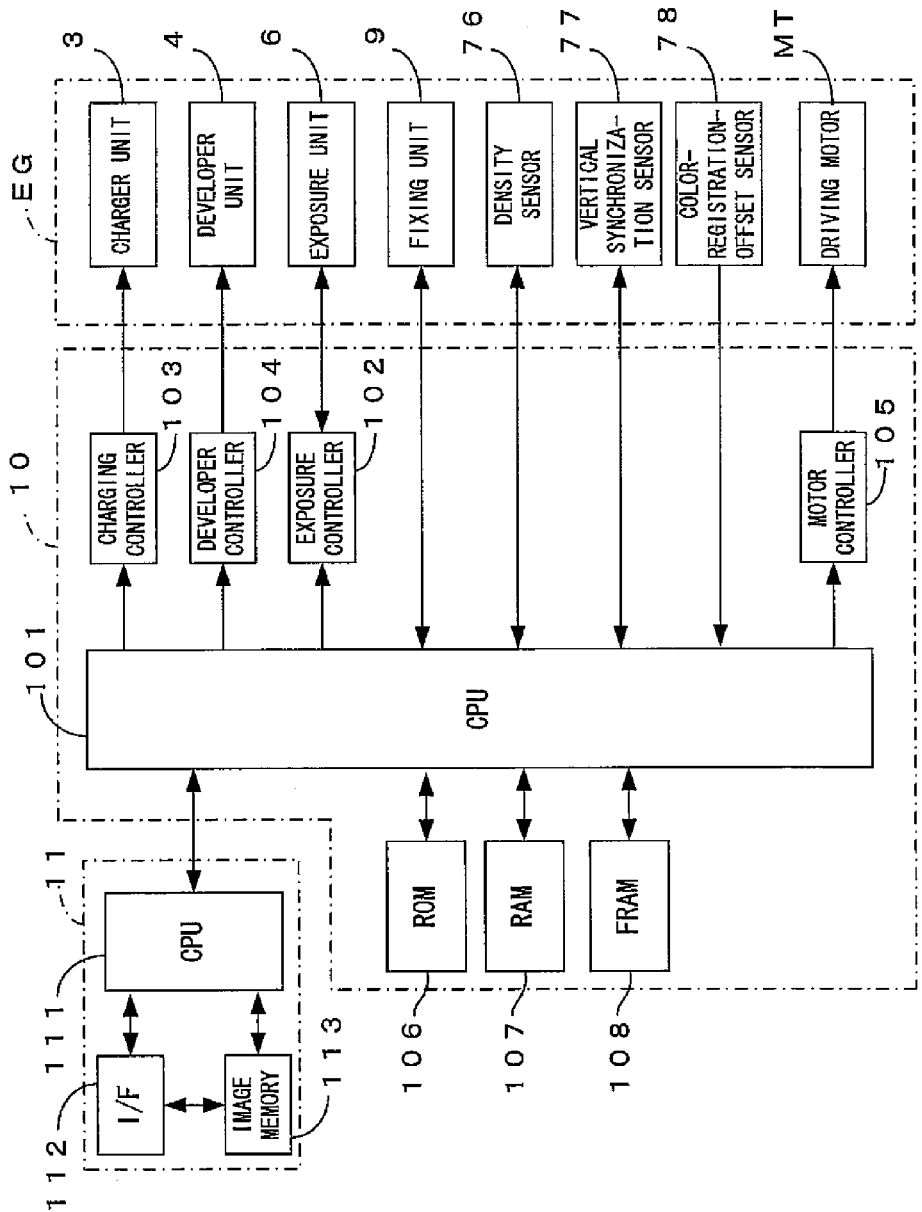
FIG. 2 is a block diagram showing an electrical arrangement of the image forming apparatus of FIG. 1.

FIG. 1 is a diagram showing an image forming apparatus according to a first embodiment. FIG. 2 is a block diagram showing an electrical arrangement of the image forming apparatus of FIG. 1. This image forming apparatus is a so-called tandem color printer, wherein photosensitive members 2Y, 2M, 2C, 2K for four colors of yellow (Y), magenta (M), cyan (C) and black (K), as latent image carriers, are juxtaposed in an apparatus body 5. The apparatus serves to form a full color image by superimposing toner images on the individual photosensitive members 2Y, 2M, 2C, 2K, or to form a monochromatic image using only the toner image of black (K). The image forming apparatus operates as follows. When an external apparatus such as a host computer applies a print command to a main controller 11 in response to a request from a user wanting to form an image, a CPU 111 of the main controller 11 sends a print command, based on which an engine controller 10 controls individual parts of an engine EG so as to form an image corresponding to the print command on a sheet S such as copy sheet, transfer sheet, paper and transparent sheet for OHP.

In the engine EG, charger units, developer units, exposure units (light scanning apparatus) and cleaners are provided in correspondence to the four photosensitive members 2Y, 2M, 2C, 2K, respectively. Thus, image forming units, each of which includes the photosensitive member, the charger unit, the developer unit, the exposure unit and the cleaner, are provided in association with the respective toner colors. The image forming unit forms the toner image of each associated toner color. It is noted that these image forming units (the charger units, developer units, exposure units and cleaners) for the respective color components are arranged the same way. Therefore, the arrangement for the yellow color is described here while individual parts of the arrangements for the other color components are represented by equivalent reference characters, respectively, and the description thereof is dispensed with.

The photosensitive member 2Y is rotatable in a direction of an arrow in FIG. 1 (sub-scan direction). More specifically, a drive motor MT is mechanically connected to one end of the photosensitive member 2Y. The motor controller 105 connected with the drive motor MT electrically, controls the drive motor MT. Thus, the photosensitive member 2Y is rotatably moved.

Figure 4:
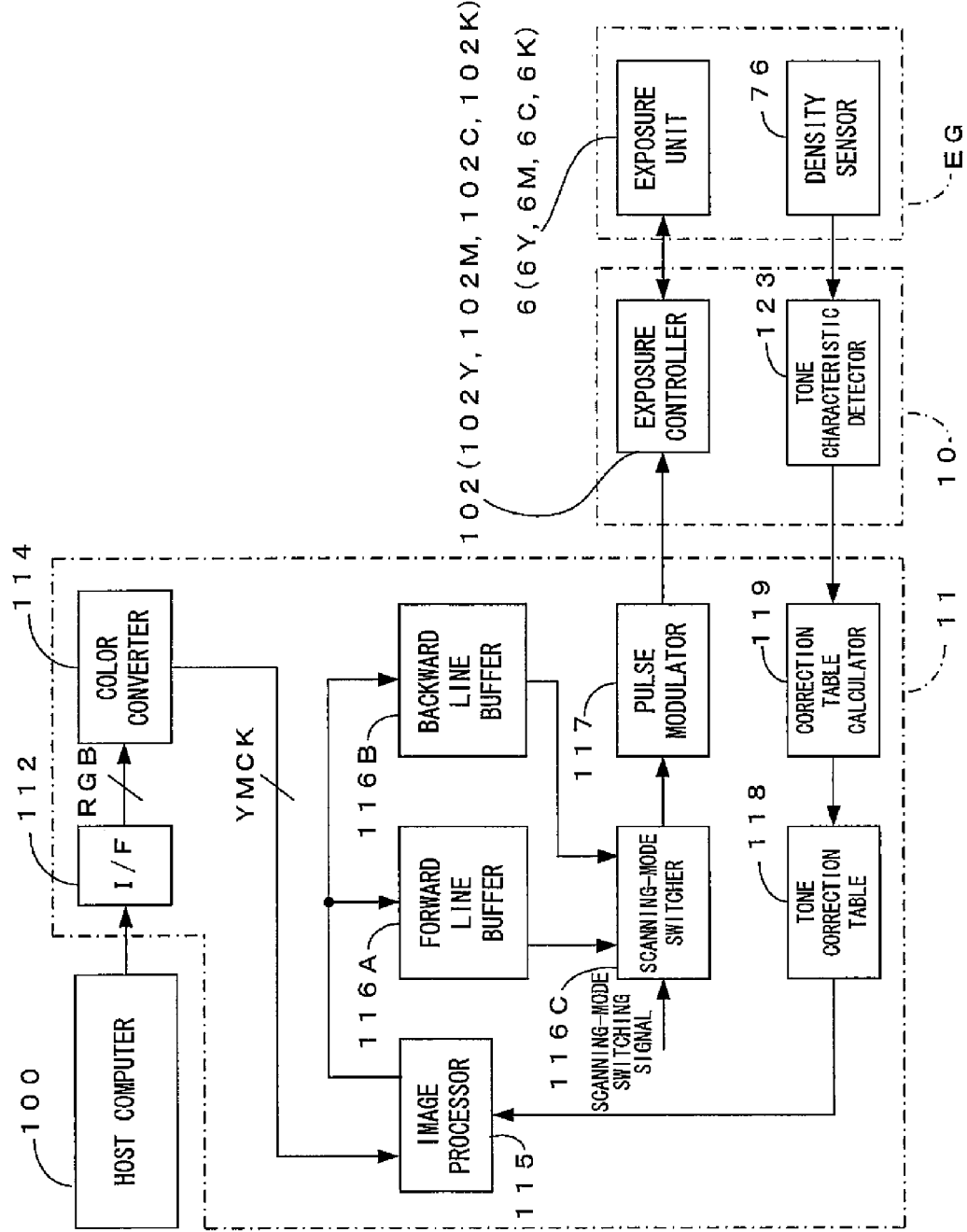
FIG. 4 is a diagram showing a scan region of the light beam in the exposure.

Around the photosensitive member 2Y driven in this manner, a charger unit 3Y, a developer unit 4Y and a cleaner (not shown) are arranged in a rotational direction thereof. The charger unit 3Y comprises a scorotron charger, for example, which is applied with a charging bias from a charge controller 103 thereby uniformly charging an outside surface of the photosensitive member 2Y to a predetermined surface potential. An exposure unit 6Y emits a light beam Ly toward the outside surface of the photosensitive member 2Y so charged by the charger unit 3Y. Thus, an electrostatic latent image corresponding to yellow-image data included in the print command is formed on the photosensitive member 2Y. The exposure unit 6Y is equivalent to a "latent image former" of the invention and operates according to a control command from an exposure controller 102Y (FIG. 4). Arrangements and operations of the exposure unit 6 (6Y, 6M, 6C, 6K) and the exposure controller 102 (102Y, 102M, 102C, 102K) will be described in details hereinlater.

The electrostatic latent image thus formed is developed with toner by means of the developer unit 4Y (developer). The developer unit 4Y contains therein a yellow toner. When a developer unit controller 104 applies a developing bias to a developing roller 41Y, the toner carried on the developing roller 41Y is made to locally adhere to surface portions of the photosensitive member 2Y according to the surface potentials thereof. As a result, the electrostatic latent image on the photosensitive member 2Y is visualized as a yellow toner image. A DC voltage or a DC voltage superimposed with an AC voltage may be used as the developing bias to be applied to the developing roller 41Y. Particularly in an image forming apparatus of a non-contact development system wherein the photosensitive member 2Y is spaced away from the developing roller 41Y and the toner is made to jump between these members for accomplishing the development with toner, the developing bias may preferably have a waveform formed by superimposing a sinusoidal-wave, triangular-wave or rectangular-wave AC voltage on the AC voltage such as to effect efficient toner jumps.

The yellow toner image developed by the developer unit 4Y is primarily transferred onto an intermediate transfer belt 71 of a transfer unit 7 in a primary transfer region TRy1. The other members for the other color components than yellow are arranged absolutely the same way as those for the yellow. A magenta toner image, a cyan toner image and a black toner image are formed on the respective photosensitive members 2M, 2C, 2K and are primarily transferred onto the intermediate transfer belt 71 in respective primary transfer regions TRm1, TRc1, TRk1.

The transfer unit 7 includes: the intermediate transfer belt 71 entrained about two rollers 72, 73; and a belt driver (not shown) for driving the roller 72 into rotation thereby rotating the intermediate transfer belt 71 in a predetermined rotational direction R2. The transfer unit is further provided with a secondary transfer roller 74 which opposes the roller 73 with the intermediate transfer belt 71 interposed therebetween and which is adapted to be moved into contact with or away from a surface of the belt 71 by means of an unillustrated electromagnetic clutch. In a case where a color image is transferred to the sheet S, primary transfer timings are controlled to superimpose the individual toner images on each other so as to form the color image on the intermediate transfer belt 71. Then, the color image is secondarily transferred onto the sheet S taken out from a cassette 8 and delivered to a secondary transfer region TR2 between the intermediate transfer belt 71 and the secondary transfer roller 74. In a case where a monochromatic image is transferred to the sheet S, only a black toner image is formed on the photosensitive member 2K and the monochromatic image is secondarily transferred onto the sheet S delivered to the secondary transfer region TR2. The sheet S thus receiving the secondarily transferred image is transported to a discharge tray on a top surface of the apparatus body via a fixing unit 9.

After the primary transfer of the toner images to the intermediate transfer belt 71, the surface potentials of the photosensitive members 2Y, 2M, 2C, 2K are reset by unillustrated static eliminators. In addition, the photosensitive members are removed of the toners remaining on their surfaces by means of the cleaners. Then, the photosensitive members are subjected to the subsequent charging by means of the charger units 3Y, 3M, 3C, 3K.

Disposed in the vicinity of the roller 72 are a transfer belt cleaner 75, a density sensor 76 (FIG. 2) and a vertical synchronous sensor 77 (FIG. 2). Of these, the cleaner 75 is adapted to be moved into contact with or away from the roller 72 by means of an unillustrated electromagnetic clutch. As moved to the roller 72, the cleaner 75 holds its blade against the surface of the intermediate transfer belt 71 entrained about the roller 72 thereby removing the toner remaining on the outside surface of the intermediate transfer belt 71 after the secondary image transfer. The density sensor 76 confronts the surface of the intermediate transfer belt 71 for sensing optical densities of patch images formed as tonal patch images on the outside surface of the intermediate transfer belt 71. The vertical synchronous sensor 77 is a sensor for detecting a reference position on the intermediate transfer belt 71. The sensor functions as a vertical synchronous sensor for outputting a synchronous signal or a vertical synchronous signal Vsync in association with a drivable rotation of the intermediate transfer belt 71 in the sub-scan direction. In this apparatus, the operations of the individual parts of the apparatus are controlled based on the vertical synchronous signal Vsync for the purposes of synchronizing the operation timings of the individual parts and precisely superimposing the toner images of the respective colors on each other.

In FIG. 2, a reference numeral 113 represents an image memory provided in the main controller 11 for storing image data supplied from the external apparatus, such as the host computer, via an interface 112. A reference numeral 106 represents a ROM for storing operation programs executed by the CPU 101, control data used for controlling the engine EG, and the like. A reference numeral 107 represents a RAM for temporarily storing the operation results given by the CPU 101, and other data. Further, denoted at 108 is an FRAM (ferroelectric memory) which saves information related to the statuses of use of the respective portions of the engine.

Figure 3:
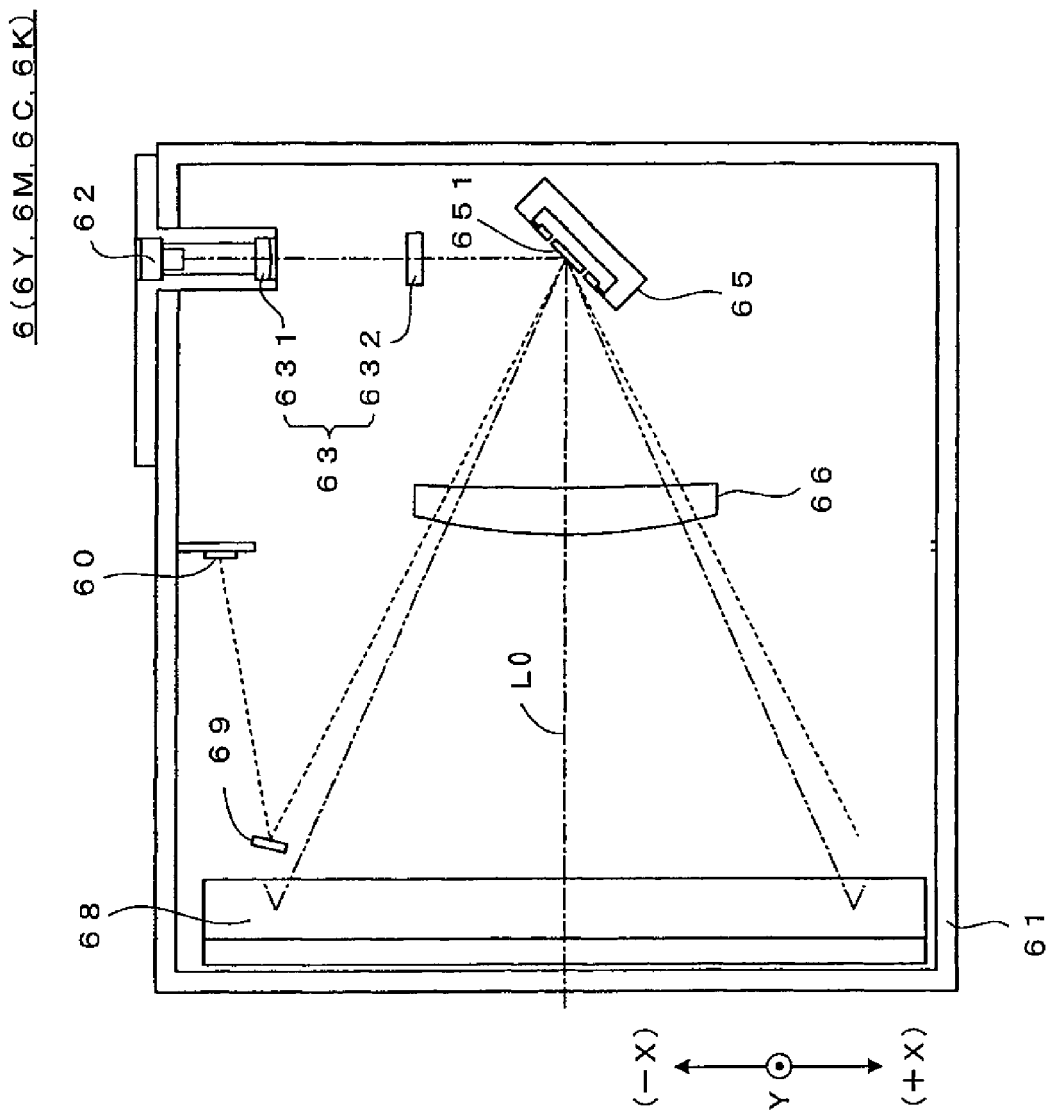
FIG. 3 is a sectional view taken on a main scan direction for showing an arrangement of the exposure unit.

FIG. 3 is a sectional view taken on a main scan direction for showing an arrangement of the exposure unit (light scanning apparatus) provided in the image forming apparatus of FIG. 1. FIG. 4 is a diagram showing a scan region of the light beam in the exposure unit of FIG. 3. Referring to these figures, the arrangements and operations of the exposure unit 6 and the exposure controller 102 are specifically described as below. The exposure unit 6 and the exposure controller 102 for the respective color components are arranged the same ways. Therefore, the arrangement for the yellow color is described here while the individual parts of the arrangements for the other color components are represented by equivalent reference characters, respectively, and the description thereof is dispensed with.

The exposure unit 6Y (6M, 6C, 6K) includes an exposure casing 61. The exposure casing 61 has a single laser light source 62Y fixed thereto so as to be capable of emitting the light beam from the laser light source 62Y. The laser light source is provided ON/OFF control as follows according to an image signal, so that the laser light source 62Y emits the light beam modulated in correspondence to the image data.

In this image forming apparatus, upon receipt of an image signal from an external apparatus such as a host computer 100, the main controller 11 performs predetermined signal processing of the image signal. The main controller 11 comprises functional blocks such as a color converter 114, an image processor 115, two types of line buffers 116A and 116B, a scanning mode switcher 116C, a pulse modulator 117, a tone correction table 118 and a correction table calculator 119.

In addition to the CPU 101, the ROM 106, and the RAM 107 shown in FIG. 2, the engine controller 10 further includes a tone characteristic detector 123 for detecting a tone characteristic of the engine EG based on a detection result given by the density sensor 76, the tone characteristic representing a gamma characteristic of the engine EG. In the main controller 11 and the engine controller 10, these function blocks may be implemented in hardware or otherwise, in software executed by the CPU 111, 101.

In the main controller 11 supplied with the image signal from the host computer 100, the color converter 114 converts RGB tone data into corresponding CMYK tone data, the RGB tone data representing the respective tone levels of RGB components of each pixel in an image corresponding to the image signal. The CMYK tone data outputted from the color converter 114 are inputted to the image processor 115.

The image processor 115 performs the following process on each color component. FIG. 5 is a diagram showing an arrangement of the image processor 115. The image processor 115 includes a tone corrector 1151 and a halftoning processor 1152. The tone corrector 1151 performs tone correction on the tone data on each pixel inputted from the color converter 114 so as to generate corrected tone data. Subsequently, the halftoning processor 1152 performs a halftoning process on the corrected tone date so as to generate halftone data. The tone corrector 1151 performs the tone correction as follows. Referring to the tone correction table 118 previously stored in the non-volatile memory, the tone corrector converts the tone data on each pixel inputted from the color converter 114 to the corrected tone data according to the tone correction table 118. The corrected tone data indicates a corrected ton level. An object of the tone correction is to compensate for the variations of the gamma characteristic of the engine EG constructed as described above, thereby to maintain the overall gamma characteristic of the image forming apparatus in an idealistic state at all times. In the image forming apparatuses of this type, the gamma characteristic varies from one apparatus to another. In addition, the apparatus per se encounters the varied gamma characteristic according to use conditions. In order to eliminate influences of the varied gamma characteristic upon the image quality, a tone control process is performed in predetermined timings for updating the contents of the aforementioned tone correction table 118 based on measured image densities.

The tone control process is performed as follows. The tonal patch images for tone correction, which are previously defined for measurement of the gamma characteristic, are formed on the intermediate transfer belt 71 by the engine EG on a per-toner-color basis. The respective densities of the tonal patch images are sensed by the density sensor 76. Based on signals from the density sensor 76, the tone characteristic detector 123 generates a tone characteristic (the gamma characteristic of the engine EG) wherein the respective tone levels of the tonal patch images are in correspondence to the respective image densities thus detected. The resultant tone characteristic is outputted to the correction table calculator 119 of the main controller 11. The correction table calculator 119, in turn, operates tone correction table data for obtaining the idealistic tone characteristic, as compensating for the measured tone characteristic of the engine EG based on the tone characteristic supplied from the tone characteristic detector 123. The correction table calculator 119 updates the contents of the tone correction table 118 according to the operation results. In this manner, the tone correction table 118 is redefined. By making such updates, the image forming apparatus is adapted to form images of a consistent quality irrespective of the variations of the gamma characteristic of the apparatus or time-related changes thereof.

Based on the corrected tone data corrected in the aforementioned manner, the halftoning processor 1152 generates the halftone data by using a so-called fattening type threshold matrix MTX. Specifically, one cell is formed of plural pixels. Based on the threshold matrix MTX, some of the plural pixels of the cell that correspond to a tone level are exclusively subjected to light exposure and development for formation of pixel-dots, whereby the size of a halftone-dot constituted by such pixel-dots is varied according to the tone level. Thus, the tone is reproduced. A specific description on the halftoning process will be made hereinlater in a section "HALFTONING PROCESS". The halftone data generated by the halftoning processor 1152 are inputted to the two line buffers 116A and 116B.

Although the line buffers 116A and 116B are common to each other in that they store halftone data (image information) constituting the I-line image data output from the image processor 115, they output the halftone data in different orders. That is, while the forward-direction line buffer 116A outputs the halftone data constituting the I-line image data in the forward direction from the beginning, the reverse-direction line buffer 116B outputs in the reverse direction from the end.

The scanning mode switcher 116C receives thus output halftone data, and based on a scanning mode switching signal, outputs at appropriate timing to the pulse modulator 117 only the halftone data output from one of the line buffers. The scanning mode switcher 116C further ensures that the pulse modulator 117 receives the tone data at such timing and in such an order corresponding to each color component.

The halftone data inputted to the pulse modulator 117 are represented by multivalued signals which indicate respective sizes of dots of color toners to be made to adhere to each pixel and an array of the toner dots. Receiving such data, the pulse modulator 117 uses the halftone data to generate a video signal for pulse width modulation of an exposure laser pulse used by the engine EG to form an image of each color. The pulse modulator 117 outputs the video signal to the engine controller 10 via an unillustrated video interface. A laser light source 62Y of the exposure unit 6 is provided ON/OFF control according to the video signal. The same operations are performed on the other color components.

Returning to FIG. 3, further explanation is made as follows. Provided in the exposure casing 61 are a collimator lens 631, a cylindrical lens 632, a deflector 65 and a scanning lens 66 such as to scan the light beam from the laser light source 62Y on the surface (not shown) of the photosensitive member 2Y. Specifically, the light beam from the laser light source 62Y is shaped into a collimated beam of a suitable size by means of the collimator lens 631 and then, is made incident on the cylindrical lens 632 powered only in a sub-scan direction Y. By adjusting the cylindrical lens 632, the collimated beam is focused onto place near a deflection mirror surface 651 of the deflector 65 with respect to the sub-scan direction Y. According to the embodiment, a combination of the collimator lens 631 and the cylindrical lens 632 functions as a beam shaping system 63 for shaping the light beam from the laser light source 62Y.

The deflector 65 is formed using a micromachining technique which utilizes a semiconductor fabrication technique for integrally forming micro machines on a semiconductor substrate. The deflector comprises a deflection mirror adapted for resonant oscillations. Specifically, the deflector 65 is capable of deflecting the light beam in a main scan direction X by means of the deflection mirror surface 651 in resonant oscillations. More specifically, the deflection mirror surface 651 is oscillatbly mounted about an oscillatory axis (torsion spring) extending substantially perpendicular to the main scan direction X. The deflection mirror sinusoidally oscillates about the oscillatory axis according to an external force applied from an operating section (not shown). The operating section applies an electrostatic, electromagnetic or mechanical external force to the deflection mirror surface 651 based on a mirror drive signal from a mirror driver (not shown) of the exposure controller 102, thereby bringing the deflection mirror surface 651 into oscillations at a frequency of the mirror drive signal. The operating section may adopt any of the drive methods based on electrostatic attraction, electromagnetic force and mechanical force. These drive methods are known in the art and hence, the description thereof is dispensed with.

FIGS. 6A and 6B diagrams showing the formation of latent image with light beam in first or second direction. In addition, the image forming apparatus having this structure is capable of making the light beam scan in the main scanning direction back and forth. That is, the light bean can scan in both the direction (+X) and the direction (−X). The halftone data constituting the 1-line image data are temporarily stored in a storage part (the line buffers 116A and 116B) as described above, and the scanning mode switcher 116C provides the pulse modulator 117 with the halftone data at appropriate timing and in a proper order. For instance, when the direction is switched to the direction (+X), as shown in FIG. 6A, the tone data are read out from the line buffer 116A in the order of DT1, DT2, . . . DTn and beam spots are irradiated upon the photosensitive member 2 in the first direction (+X) based on each piece of the halftone data, whereby line latent images LI(+X) are formed. On the contrary, when the direction is switched to the direction (−X), as shown in FIG. 6B, the halftone data are read out from the line buffer 116B in the order of DTn, DT(n−1), . . . DT1 and beam spots are irradiated upon the photosensitive member 2 in the second direction (−X) based on each piece of the halftone data, whereby line latent images LI(−X) are formed.

Halftoning Process

As described in the above section "ARRANGEMENT OF APPARATUS", the embodiment is constituted such that the halftoning processor 1152 generates the halftone data by applying the fattening type threshold matrix MTX to the corrected tone data outputted from the tone corrector 1151. The halftoning process according to the embodiment will be described as below with reference to FIG. 7, FIG. 8A and FIG. 8B. FIG. 7 is a diagram showing the halftoning process performed by the halftoning processor 1152. In the embodiment, a 1×4 cell CL14 consisting of one pixel in the main scanning direction and four pixels in the sub scanning direction is used, whereas some of the pixels of the 1×4 cell CL14 that correspond to a tone level are exclusively subjected to light exposure and development for formation of pixel-dots. In this process, which of the pixels is subjected to the formation of a pixel-dot is decided based on the result of comparison between the corrected tone data and the threshold matrix MTX to be specifically described as below. The corrected tone data and the threshold value of the 1×4 threshold matrix MTX14 are compared on a per-pixel basis. If the corrected tone data exceeds the threshold value of the corresponding pixel, a spot latent image is formed on the pixel of interest. Then the spot latent image is developed so as to form a pixel-dot on the pixel of interest. If the corrected tone data is below the threshold value, the spot latent image is not formed on the pixel. In a case where the corrected tone data represents a tone level 2, for example, a spot is formed on each of cross-hatched pixels of the 1×4 cell CL14 shown in FIG. 7. It is noted herein that a cell consisting of N-pixels in the main scanning direction and M-pixels in the sub scanning direction is referred to as "N×M cell", and that a threshold matrix corresponding to the N×M cell is referred to as "N×M threshold matrix".

FIGS. 8A and 8B are diagrams showing an operation of the 1×4 threshold matrix MTX14. FIG. 8A shows the 1×4 threshold matrix MTX14, whereas FIG. 8B shows the growth of the halftone-dot in the 1×4 cell CL14 in a case where the 1×4 threshold matrix MTX14 is used. The 1×4 threshold matrix MTX14 shown in FIG. 8A is a fattening type threshold matrix wherein the halftone-dot is increased in size according to the increase of the tone level. Specifically, as the tone level is increased from 1 to 4, a number of pixels which are exposed to the light, as represented by the cross-hatched pixels in FIG. 8B, is increasing from 1 to 4 according to the tone level, whereby the halftone-dot grows from the cell center, as shown in FIG. 5B.

Cell Arrangement

Figure 9:
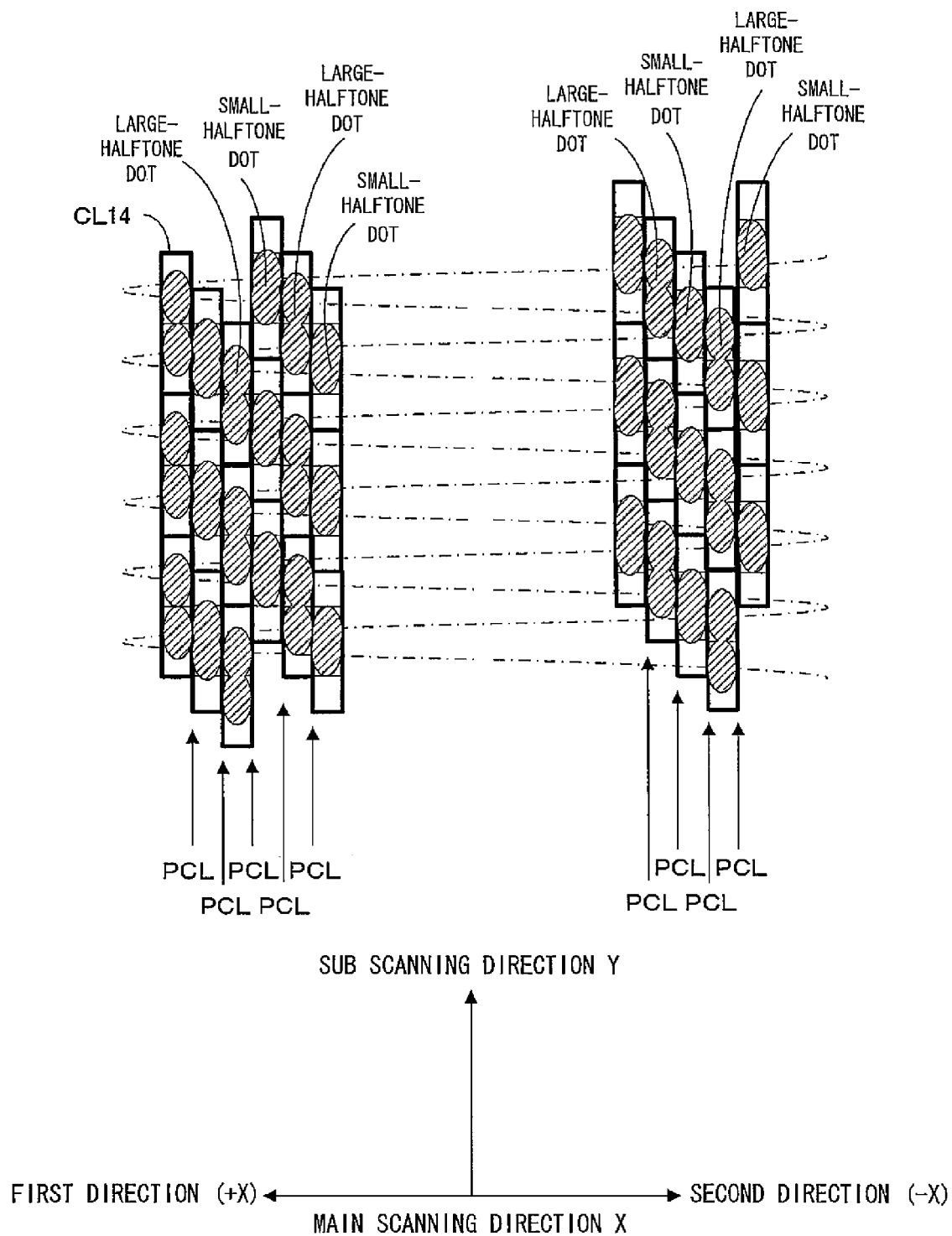
FIG. 9 is a diagram showing a method of arranging the 1×4 cells CL14 according to the embodiment.

FIG. 9 is a diagram showing a method of arranging the 1×4 cells CL14 according to the embodiment. In FIG. 9, a dot-dash line represents a scanning line as a track on which the light beam is scanned; a rectangle in bold solid line represents the 1×4 cell CL14; and an ellipse in solid line represents a light beam spot on the photosensitive member. According to the embodiment, the plural 1×4 cells CL14 are contiguously arranged in the main scanning direction X, whereas the cells mutually adjoining at a particular contiguous location PCL are mutually shifted by an odd number of pixel(s) in the sub scanning direction Y, the particular contiguous location belongs to a plurality of contiguous locations at which the cells mutually adjoin in the main scanning direction X. In other word, the cells CL14 adjoining at the particular contiguous location out of the plurality of contiguous locations are mutually shifted by an odd number of pixel(s) in the sub scanning direction. Specifically, the particular contiguous location PCL is provided at each of the contiguous locations in the main scanning direction X, whereas the cells mutually adjoining at the particular contiguous location PCL are arranged in a manner that the downstream cell with respect to a first direction (+X) of the main scanning direction is shifted from the upstream cell by one pixel in the sub scanning direction Y.

According to the invention of this constitution, the light beam is scanned in both of the first direction (+X) of the main scanning direction X and a second direction opposite of the first direction as irradiated in a spot shape on the surface of the photosensitive member (the surface of the latent image carrier). Therefore, in the formation of linear latent images on the surface of the photosensitive member as shown in FIG. 6, the light beam is scanned on the surface of the photosensitive member in the first direction (+X) of the main scanning direction X as irradiated in a spot shape thereon, so that plural spot latent images are arranged in the main scanning direction to form a linear latent image LI(+x). On the other hand, the light beam is scanned in the second direction (−X) opposite of the first direction (+X), so that plural spot latent images are arranged in the main scanning direction to form a linear latent image LI(−X). As a result, the linear latent images LI(+X) and LI(−X) are alternately formed in the sub scanning direction Y.

Figure 10:
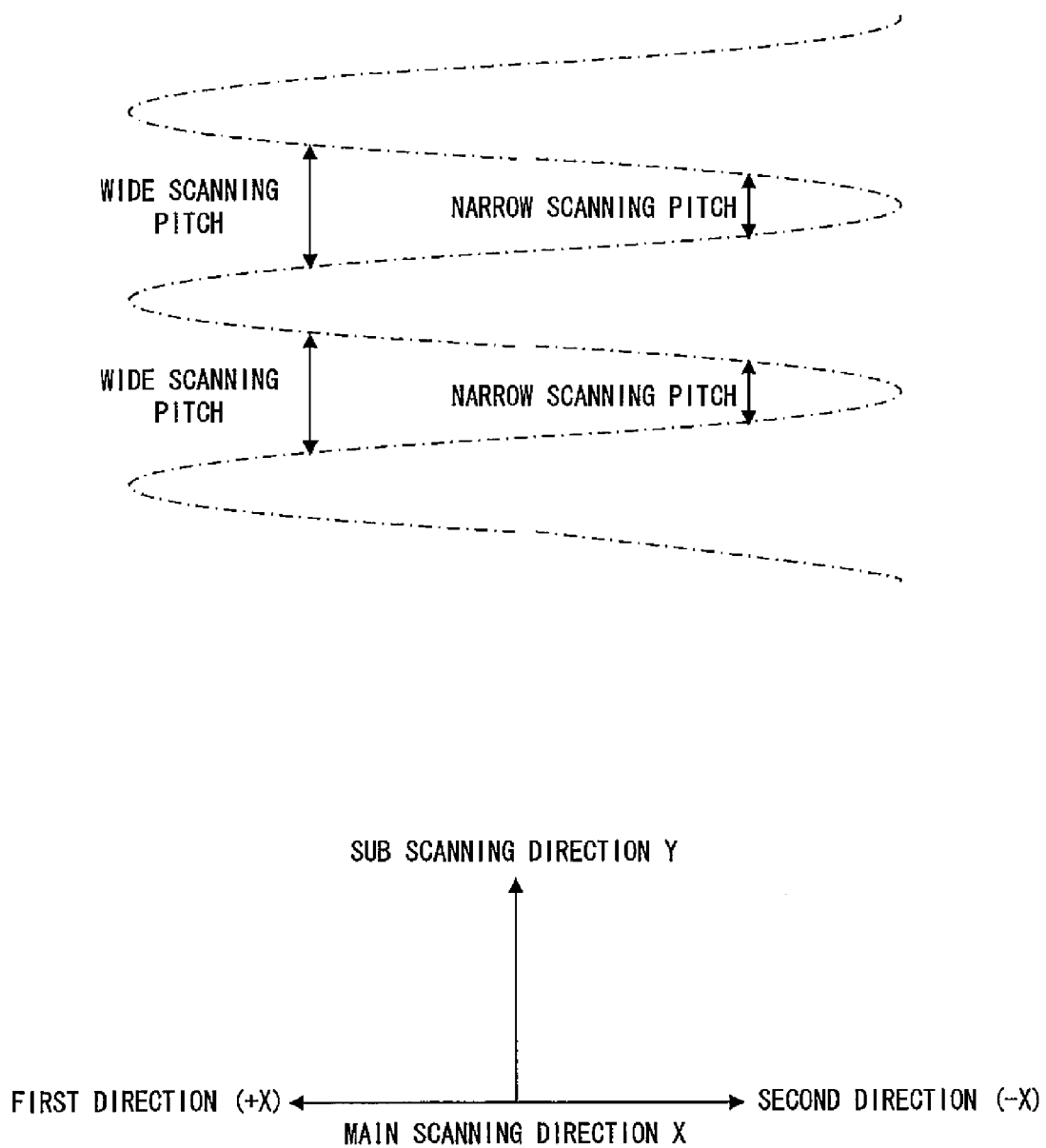
FIG. 10 shows the scanning track of the light beam.

According to the invention of this constitution, the light beam is reciprocally scanned on the surface of the photosensitive member in the main scanning direction X, while the surface of the photosensitive member is driven in the sub scanning direction Y substantially perpendicular to the main scanning direction X. Therefore, the scanning track of the light beam (track of formed spot latent images) on the photosensitive member surface is formed as indicated by a dot-dash line in FIG. 10, for example, so that the scanning pitch in the sub scanning direction Y is inconstant. It is noted here that FIG. 10 shows the scanning track of the light beam. Such an inconstancy of the scanning pitch in the sub scanning direction Y is particularly significant in proximity of the ends of the scanning track in the main scanning direction X. Therefore, the following image defect may occur in a case where the fattening type threshold matrix is used for performing the tone reproduction on the cell including a larger-than-four even number (even number larger than four like 4, 6, 8, etc) of pixels arranged in the sub scanning direction Y, as illustrated by the image forming method or the image forming apparatus according to the invention. That is, the halftone image is increased in density at one end with respect to the main scanning direction X and is decreased in density at the other end. The reason will be specifically described as below.

Figure 12:
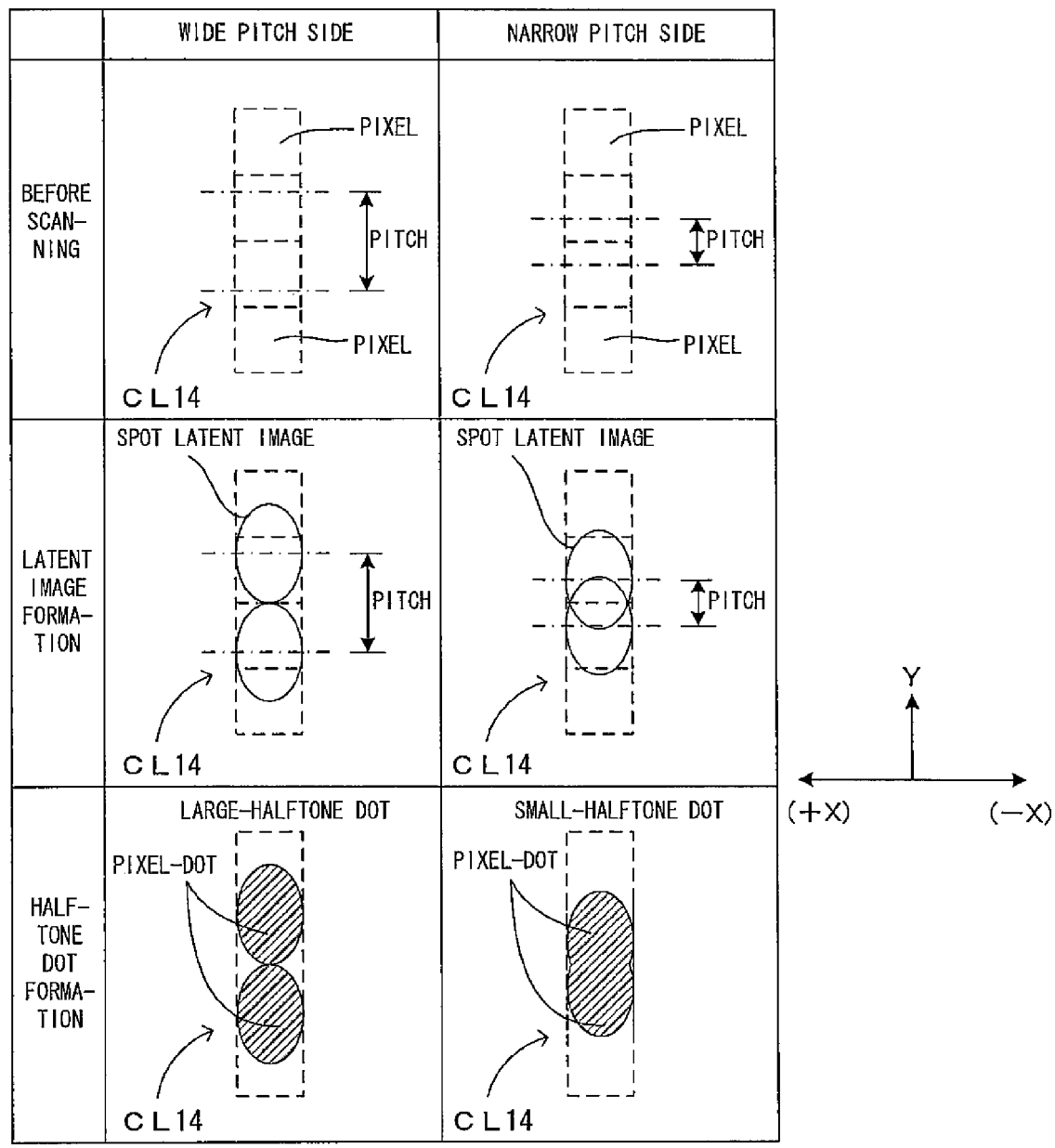

FIG. 11 and FIG. 12 are diagrams for explaining the reason of the occurrence of the above image defect. It is noted here that a dot-dash line in FIG. 11 represents the scanning track of the light beam on the latent image carrier; an ellipse in solid line represents an area irradiated with the beam spot; and a rectangle in bold solid line represents the 1×4 cell. The reason of the occurrence of the above image defect will be described by way of example of the 1×4 cell. It is to be noted however that the aforementioned problem does not occur only when the 1×4 cell is used. The above problem is also likely to occur when the fattening type threshold matrix is used for performing the tone reproduction on a cell other than the 1×4 cell, which includes a larger-than-four even number of pixels arranged in the sub scanning direction Y.

FIG. 11 and FIG. 12 illustrate a case where a halftone image of a tone level 2 is formed. In this case, the spot latent images are formed only on two (two central pixels out of four pixels in cell CL14 in FIG. 12) of the four pixels constituting the 1×4 cell CL14, the two pixels corresponding to threshold values 1 and 2. The light-beam scanning tracks corresponding to the spot latent images are relatively widely spaced from each other on the wide pitch side (the left-hand side in FIG. 11 and FIG. 12), whereas the scanning tracks are relatively closely spaced from each other on the narrow pitch side (the right-hand side in FIG. 11 and FIG. 12). As illustrated by FIG. 11 and a "latent image formation" block of FIG. 12, the spot latent images formed on these pixels on the wide pitch side have a wider pitch in the sub scanning direction Y, whereas the spot latent images formed on these pixels on the narrow pitch side have a narrower pitch in the sub scanning direction Y. As illustrated by a "halftone-dot formation" block of FIG. 12, two pixel-dots formed by developing these latent images with toner are relatively widely spaced from each other on the wide pitch side, so that the pixel-dots account for a large area percentage of the area of the cell CL14. In contrast, two pixel-dots on the narrow pitch side are relatively closely spaced from each other so that the pixel-dots account for a smaller area percentage of the area of the cell CL14, as compared with the pixel-dots on the wide pitch side. Because of the different pitches of the scanning tracks, the formation of halftone-dots corresponding to the same tone level results in the formation of a "large-halftone-dot" and a "small halftone-dot". What is more, in the apparatus wherein the cells CL14 are simply arranged in the main scanning direction X, the area percentage of pixel-dots in 1×4 cell CL14 is the greatest at the left-end and is progressively decreased toward the right-end, where the area percentage of pixel-dots is the smallest in 1×4 cell CL14, as shown in FIG. 11 and FIG. 12. Therefore, despite of the formation of the halftone-dots correspondence to the same tone level, density of toner are progressively decreased the left-end side toward the right-end side (in the direction of an arrow of FIG. 11). This results in density difference between the left-end side and the right-end side. That is, the image defect occurs wherein the halftone image is increased in density at the one end with respect to the main scanning direction and is decreased in density at the other end.

According to the invention for overcoming such an image defect, a plurality of cells, each including a larger-than-four even number of pixels arranged in the sub scanning direction, are contiguously arranged in the main scanning direction. Furthermore, the cells mutually adjoining at not less than one particular contiguous location are mutually shifted in the sub scanning direction, the particular contiguous location belonging to the plural contiguous locations at which the cells mutually adjoin in the main scanning direction. In other word, the cells adjoining at the particular contiguous location out of the plurality of contiguous locations are mutually shifted by an odd number of pixel(s) in the sub scanning direction. It is therefore possible to prevent the phenomenon that density of toner is progressively decreased from the left-end side toward the right-end side despite of the formation the halftone-dots correspondence to the same tone level. Thus is obviated the image defect wherein the density differs between the opposite ends with respect to the main scanning direction. The reason is described in conjunction with the description of the first embodiment.

In the first embodiment, the particular contiguous location is provided at each of the contiguous locations in the main scanning direction X. Furthermore, the cells mutually adjoining at the particular contiguous location are arranged in a manner that the downstream cell with respect to the first direction of the main scanning direction is shifted from the upstream cell by one pixel in the sub scanning direction. In a case where a halftone image of a tone level 2 is formed, for example, the aforesaid "large-halftone-dot" and "small halftone-dot" alternately appear in the main scanning direction X. Thus is obviated the phenomenon that the density is progressively decreased from the left-end side toward the right-end side. Therefore, a favorable tone reproduction may be accomplished by obviating the image defect wherein the density differs between the opposite ends with respect to the main scanning direction.

According to the embodiment, the 1×4 cells CL14 are contiguously arranged in the main scanning direction X, while the 1×4 cells CL14 mutually adjoining at the particular contiguous location PCL are arranged in a manner that the downstream 1×4 cell CL14 with respect to the first direction (+X) of the main scanning direction is shifted from the upstream 1×4 cell CL14 by one pixel in the sub scanning direction Y. Therefore, in the formation of the halftone image of the tone level 2, for example, the relation between the pitches of the scanning tracks involved in the pixel-dot formation is inverted at the particular contiguous location PCL, as shown in FIG. 9. Specifically, the scanning pitch on the upstream side of the particular contiguous location PCL in the main scanning direction X becomes "wide" (or "narrow"), whereas the scanning pitch on the downstream side thereof becomes "narrow" (or "wide"). As a result, the "large-halftone-dot" having the relatively greater area percentage based on the 1×4 cell CL14 and the "small halftone-dot" having the smaller area percentage alternately appear in the main scanning direction X. Accordingly, the aforementioned phenomenon that the density is progressively decreased from the left-end side (the left end in FIG. 9) toward the right-end side (the right end in FIG. 9) may be obviated. Therefore, the favorable tone reproduction may be accomplished by preventing the image defect wherein the density differs between the opposite ends with respect to the main scanning direction X.

Modifications of First Embodiment

Figure 13:
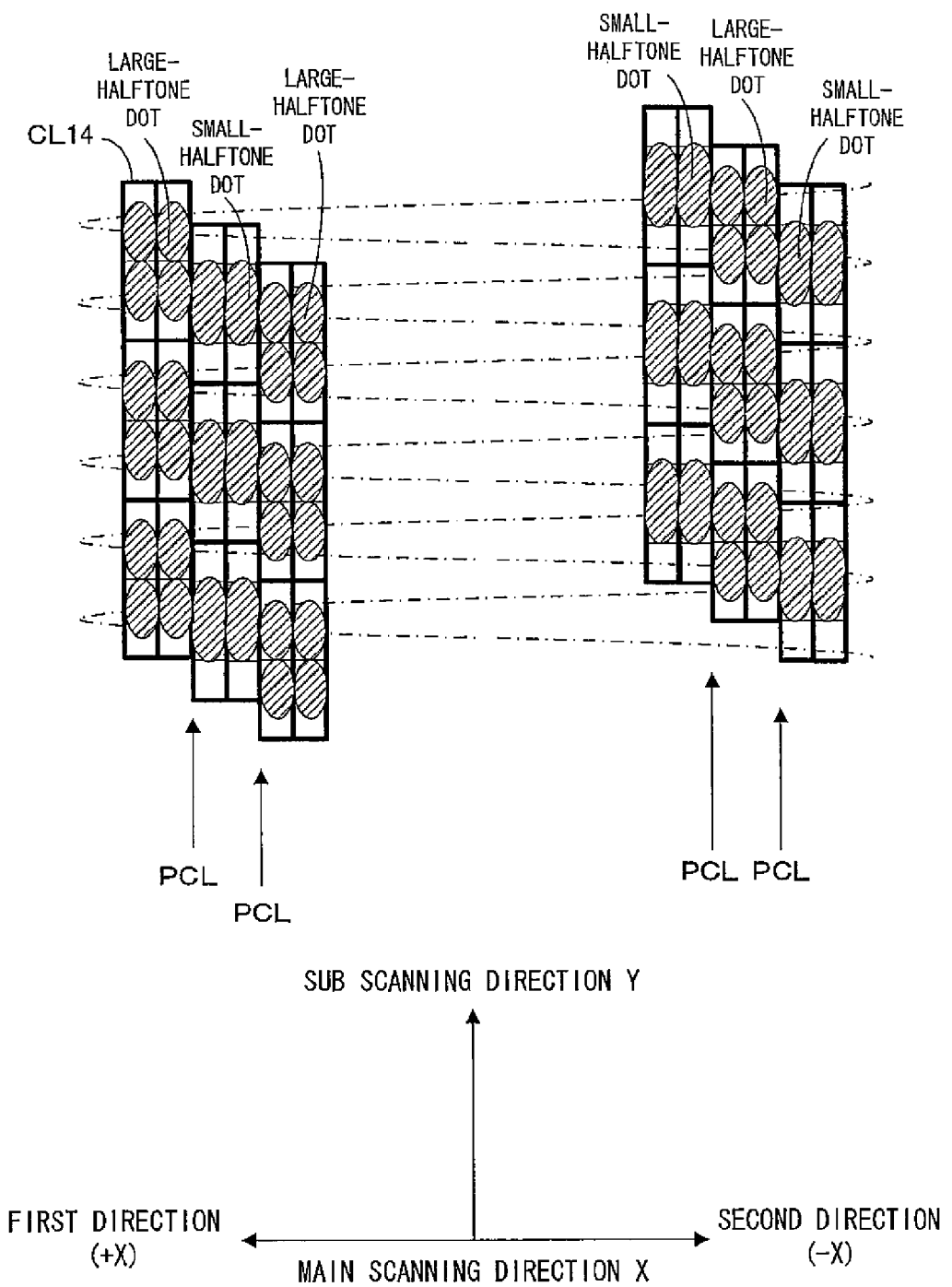
FIG. 13 is a diagram showing modification of first embodiment.

It is noted that the invention is not limited to the first embodiment described above but various modifications may be made thereto so long as such modifications do not deviate from the scope of the invention. In the cell arrangement of the embodiment, the particular contiguous location PCL is provided at each of the contiguous locations in the main scanning direction X. However, the mode of provision of the particular contiguous location PCL is not limited to this. For example, the particular contiguous locations may be periodically disposed similarly to the above embodiment or may be disposed in a non-periodic manner. As other modes of periodically disposing the particular contiguous locations PCL, the particular contiguous location PCL may be provided at every two contiguous locations in the main scanning direction X, as shown in FIG. 13 for example. It is noted here that FIG. 13 is a diagram showing another embodiment of the invention. In FIG. 13, a dot-dash line represents the scanning line as the track on which the light beam is scanned; a rectangle in bold solid line represents the 1×4 cell CL14; and an ellipse in solid line represents the beam spot on the photosensitive member. In this case, as well, the large-halftone-dot and the small halftone-dot alternately appear in the main scanning direction X as shown in FIG. 13 when the halftone image of the tone level 2 is formed, for example. Therefore, the favorable tone reproduction may be accomplished by preventing the image defect wherein the density differs between the opposite ends with respect to the main scanning direction X.

Figure 14:
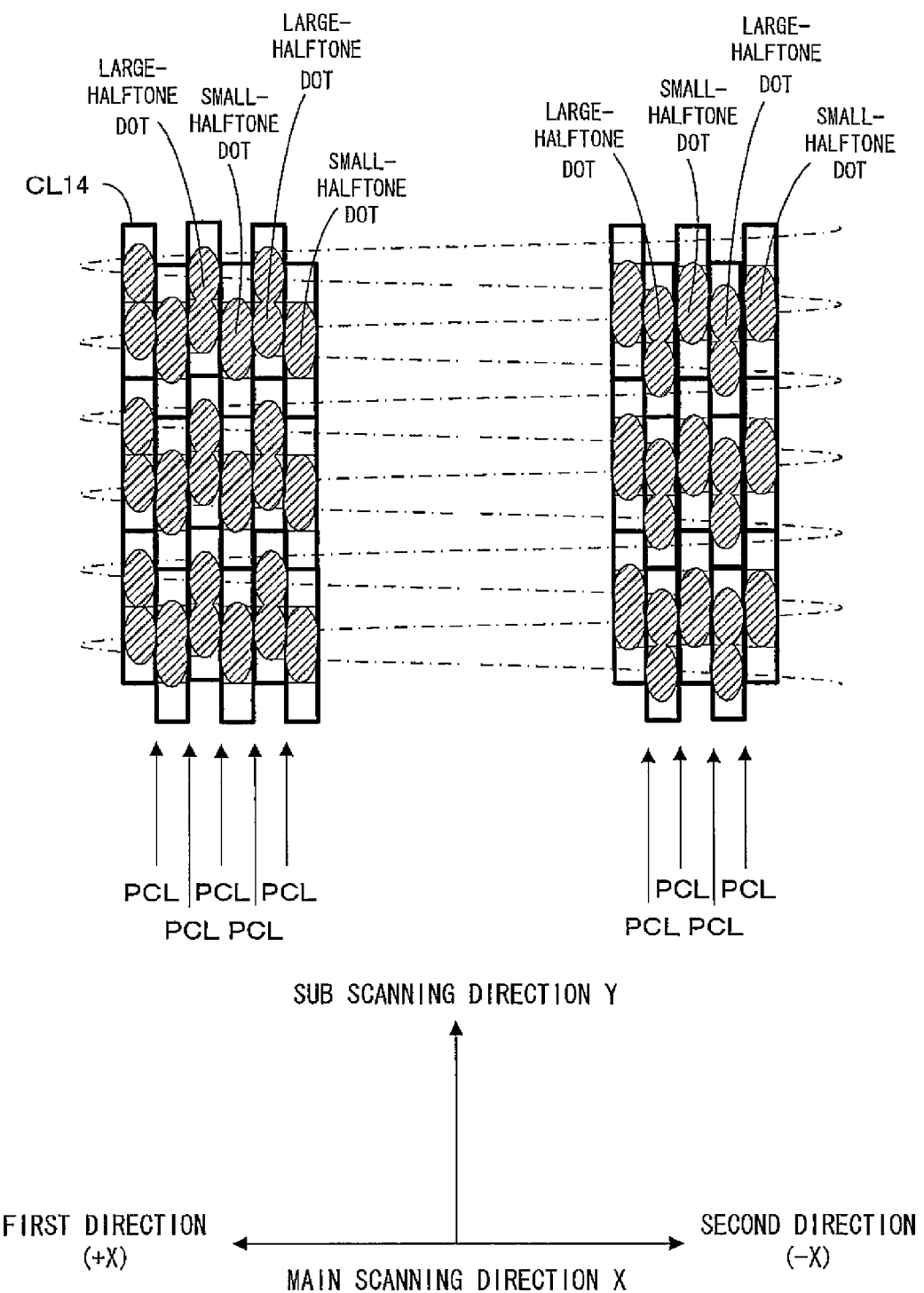
FIG. 14 is a diagram showing another modification of first embodiment.

In the above embodiment, the cells mutually adjoining at the particular contiguous location PCL are arranged in a manner that the downstream cell with respect to the first direction (+X) of the main scanning direction is shifted from the upstream sell by one pixel in the sub scanning direction Y. However, the way to shift the cells is not limited to this. As shown in FIG. 14, for example, at each odd-numbered particular contiguous location from the upstream side in the first direction (+X) of the main scanning direction, the downstream cell with respect to the first direction (+X) of the main scanning direction may be shifted from the upstream cell by one pixel in the sub scanning direction. At each even-numbered particular contiguous location from the upstream side in the first direction (+X) of the main scanning direction, on the other hand, the downstream cell with respect to the first direction (+X) of the main scanning direction may be shifted from the upstream cell by one pixel in the opposite direction of the sub scanning direction. FIG. 14 is a diagram showing still another embodiment of the invention. In FIG. 14, a dot-dash line represents the scanning line as the track on which the light beam is scanned; a rectangle in bold solid line represents the 1×4 cell CL14; and an ellipse in solid line represents the beam spot on the photosensitive member. In this case, as well, the large-halftone-dot and the small halftone-dot alternately appear in the main scanning direction X as shown in FIG. 14 when the halftone image of the tone level 2 is formed, for example. Therefore, the favorable tone reproduction may be accomplished by preventing the image defect wherein the density differs between the opposite ends with respect to the main scanning direction X. In short, the effect of the invention may be attained by arranging the cells in a manner that the cells mutually adjoining at the particular contiguous location PCL are mutually shifted by an odd number of pixel(s) in the sub scanning direction.

While the above embodiment uses the 1×4 cell CL14 consisting of four pixels in the sub scanning direction and one pixel in the main scanning direction, the type of cell is not limited to this. The effect of the invention may be attained so long as a cell including a larger-than-four even number of pixels in the sub scanning direction is used. There may be used, for example, 4×4 cell, 8×6 cell, 8×8 cell and the like, which will be exemplified by the following examples.

Second Embodiment

Halftoning Process

Figure 15:
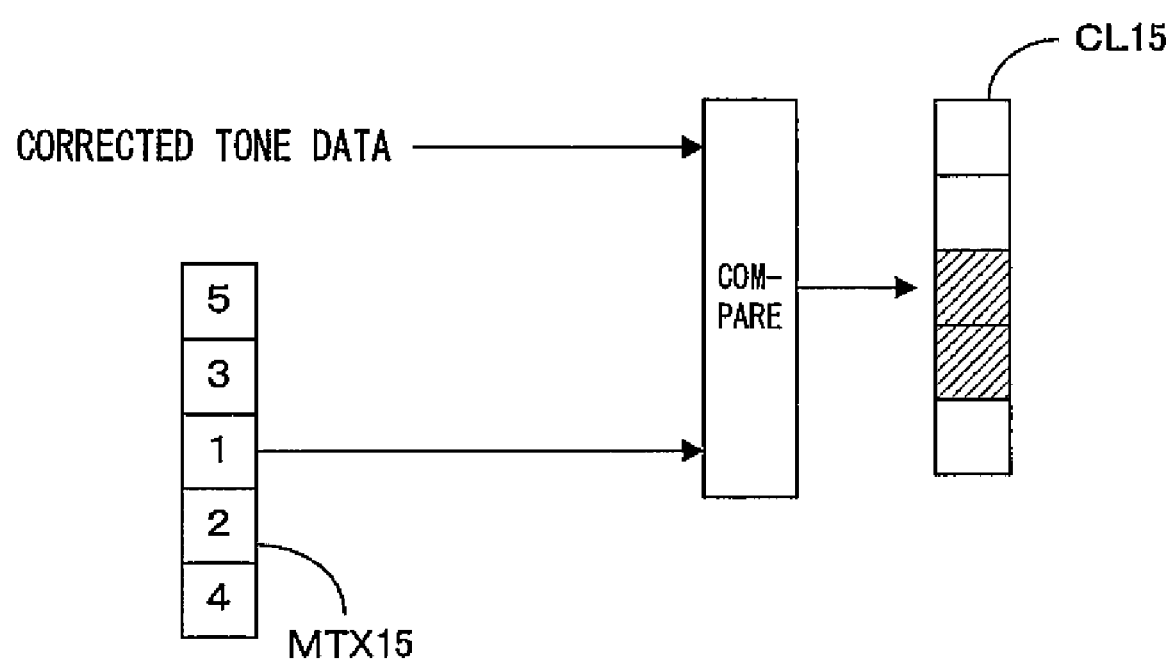
FIG. 15 is a diagram showing the halftoning process performed by the halftoning processor.

According to a second embodiment, the halftoning processor 1152, similarly to that of the first embodiment, generates the halftone data by applying the fattening type threshold matrix MTX to the corrected tone data outputted from the tone corrector 1151. The halftoning process according to the second embodiment will be described as below with reference to FIG. 15, FIG. 16A and FIG. 16B. FIG. 15 is a diagram showing the halftoning process performed by the halftoning processor 1152. The second embodiment uses a 1×5 cell CL15 consisting of one pixel in the main scanning direction X and five pixels in the sub scanning direction Y. Some of the pixels of the 1×5 cell CL15 that correspond to a tone level are exclusively subjected to light exposure and development for formation of pixel-dots. In this process, which of the pixels is subjected to the formation of a pixel-dot is decided based on the result of comparison between the corrected tone data and the threshold matrix MTX to be specifically described as below. Specifically, the corrected tone data and the threshold value of a 1×5 threshold matrix MTX15 are compared on a per-pixel basis. If the corrected tone data exceeds the threshold value of the corresponding pixel, a spot latent image is formed on the pixel of interest. Then the spot latent image is developed so as to form a pixel-dot on the pixel of interest. If the corrected tone data is below the threshold value, the spot latent image is not formed on the pixel. In a case where the corrected tone data represents a tone level 2, for example, a spot is formed on each of cross-hatched pixels of the 1×5 cell CL15 shown in FIG. 15.

FIG. 16A is a diagram showing the 1×5 threshold matrix MTX15, whereas FIG. 16B is a diagram showing the growth of a halftone-dot in the 1×5 cell CL15 in a case where the 1×5 threshold matrix MTX15 is used. The 1×5 threshold matrix MTX15 shown in FIG. 16A is a fattening type threshold matrix wherein the halftone-dot is increased in size according to the increase of the tone level. Specifically, as the tone level is increased from 1 to 5, a number of pixels which are exposed to the light, as represented by the cross-hatched pixels in FIG. 16B, is increasing from 1 to 5 according to the tone level. Thus, the halftone-dot grows from the cell center.

Cell Arrangement

Figure 17A:
FIG. 17A is a diagram showing the 1×5 threshold matrix MTX15.
Figure 17B:
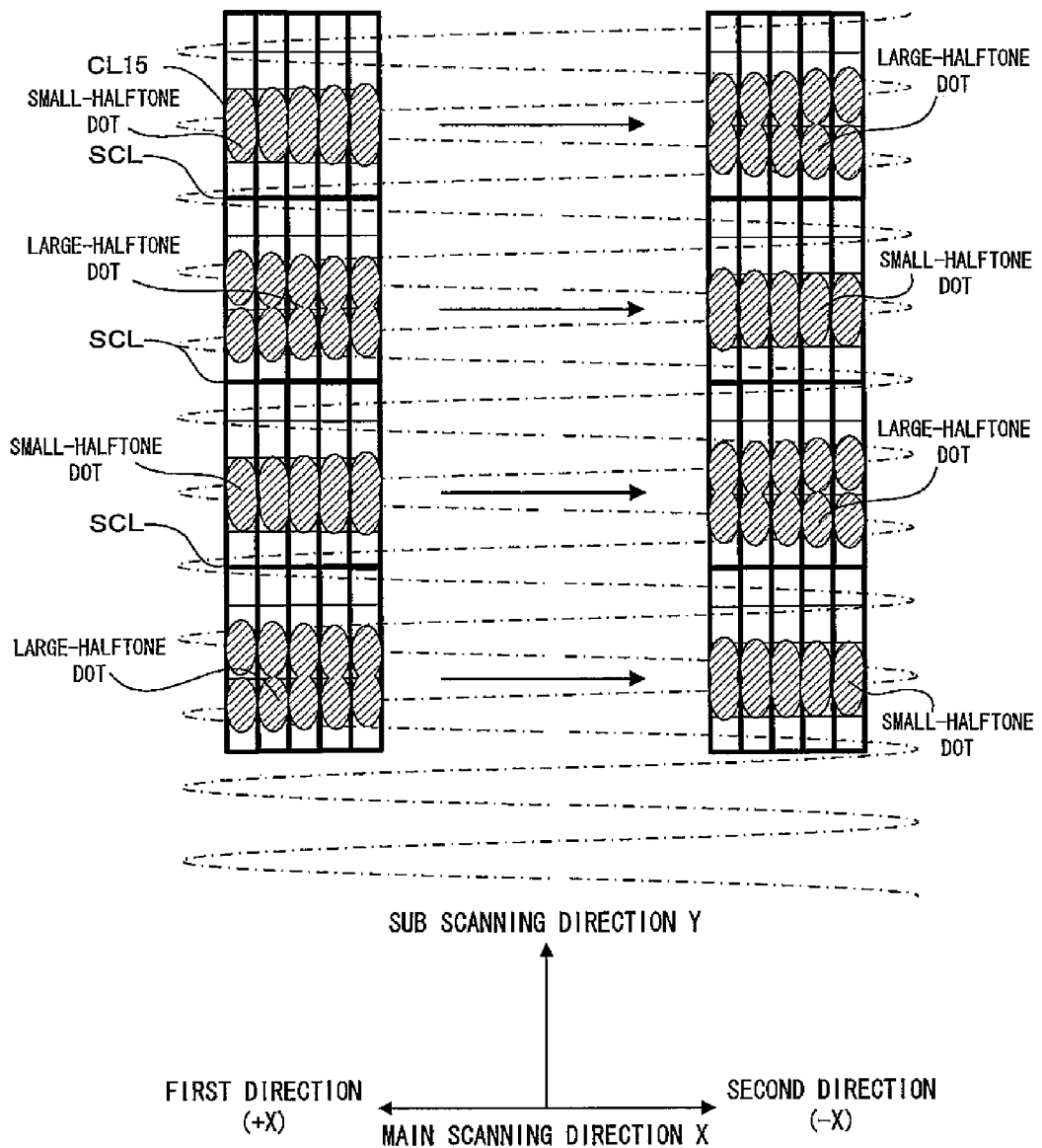
FIG. 17B is a diagram showing a arrangement of the 1×5 cells CL15 according to the second embodiment.

FIG. 17B is a diagram showing a method of arranging the 1×5 cells CL15 according to the second embodiment. In FIG. 17B, a dot-dash line represents the scanning track of the light beam on the surface of the photosensitive member (surface of the latent image carrier); an ellipse in solid line (cross-hatched area) represents an area where the pixel-dot is formed by irradiating the beam spot and developing the irradiated area; and a rectangle in bold solid line represents the 1×5 cell CL15. In the second embodiment, the 1×5 cells CL15, each consisting of one pixel in the main scanning direction X and five pixels (a larger-than-three odd number of pixels) in the sub scanning direction Y, are contiguously arranged in the sub scanning direction Y (FIG. 17.B). A larger-than-three odd number means an odd number larger than three like 3, 5, 7, etc. In a case where a halftone image of a tone level 2, for example, is formed using the 1×5 cells CL15 each including an odd number of pixels in the sub scanning direction Y, as shown in FIG. 17.B, the relation between the pitches of the scanning tracks involved in the formation of the pixel dot is inverted at a contiguous location SCL at which the 1×5 cells CL15 mutually adjoin in the sub scanning direction Y. Specifically, the scanning pitch on the upstream side of the contiguous location SCL in the sub scanning direction Y becomes "wide" (or "narrow"), whereas the scanning pitch on the downstream side thereof becomes "narrow" (or "wide"). Accordingly, a pattern wherein the "large-halftone-dot" on the left-end side of FIG. 17B is progressively decreased to the "small halftone-dot" on the right-end side, and an inverse pattern wherein the "small halftone-dot" on the left-end side of FIG. 17B is progressively increased to the "large-halftone-dot" on the right-end side alternate each other via the contiguous location SCL in the sub scanning direction Y. On both of the left-end side and the right-end side of FIG. 17B, therefore, the "large-halftone-dot" and the "small halftone-dot" alternately appear in the sub scanning direction Y. Thus, the density difference between the halftone images formed in the left-end area and the right-end area, specifically described as below, is reduced. Therefore, the favorable tone reproduction may be accomplished by preventing the image defect wherein the density differs between the opposite ends with respect to the main scanning direction X.

According to the invention of this constitution, the light beam is reciprocally scanned on the surface of the photosensitive member in the main scanning direction, while the surface of the photosensitive member is driven in the sub scanning direction substantially perpendicular to the main scanning direction. Therefore, the scanning track of the light beam on the surface of the photosensitive member is formed as indicated by the dot-dash line in FIG. 10, so that the scanning pitch in the sub scanning direction is inconstant. Such an inconstancy of the scanning pitch in the sub scanning direction is particularly significant in proximity of the end of the scanning track with respect to the main scanning direction. Therefore, in the case of the tone reproduction based on the fattening type threshold matrix as illustrated by the image forming method or the image forming apparatus according to the invention, the aforementioned image defect may occur wherein the halftone image is increased in density at the one end with respect to the main scanning direction and is decreased in density at the other end.

In order to overcome such an image defect, the second embodiment is constituted such that the cells, each including a larger-than-three odd number of pixels in the sub scanning direction, are contiguously arranged in the sub scanning direction. It is therefore possible to prevent the phenomenon that the density of halftone images is progressively decreased from the left-end side toward the right-end side despite of the formation of the halftone-dots correspondence to the same tone level. Thus is obviated the image defect wherein the density differs between the opposite ends with respect to the main scanning direction. The reason is described in conjunction with the description of the second embodiment.

In FIG. 17B, the 1×5 cells CL15, each consisting of one pixel in the main scanning direction X and five pixels (a larger-than-three odd number of pixels) in the sub scanning direction Y, are contiguously arranged in the sub scanning direction Y. The second embodiment uses the 1×5 threshold matrix MTX15 of fattening type, shown in FIG. 16A and FIG. 17A, in correspondence to such a 1×5 cell. In a case where a halftone image of a tone level 2, for example, is formed using the 1×5 cell CL15 including the odd number of pixels in the sub scanning direction Y, as shown in FIG. 17B, the relation between the pitches of the scanning tracks involved in the pixel-dot formation is inverted at the contiguous location SCL at which the 1×5 cells CL15 mutually adjoining in the sub scanning direction Y. Specifically, the scanning pitch on the upstream side of the contiguous location SCL in the sub scanning direction Y becomes "wide" (or "narrow"), whereas the scanning pitch on the downstream side becomes "narrow" (or "wide"). Accordingly, the pattern wherein the "large-halftone-dot" on the left-end side of FIG. 17B is progressively decreased to the "small halftone-dot" on the right-end side, and the inverse pattern wherein the "small halftone-dot" on the left-end side of FIG. 17B is progressively increased to the "large-halftone-dot" on the right-end side alternate each other via the contiguous location SCL in the sub scanning direction Y. On both of the left-end side and the right-end side of FIG. 17B, therefore, the "large-halftone-dot" and the "small halftone-dot" alternately appear in the sub scanning direction Y. Thus, the density difference between the halftone images formed in the left-end area and the right-end area is reduced. Therefore, the favorable tone reproduction may be accomplished by preventing the image defect wherein the density differs between the opposite ends with respect to the main scanning direction X.

Third Embodiment

Figure 18:
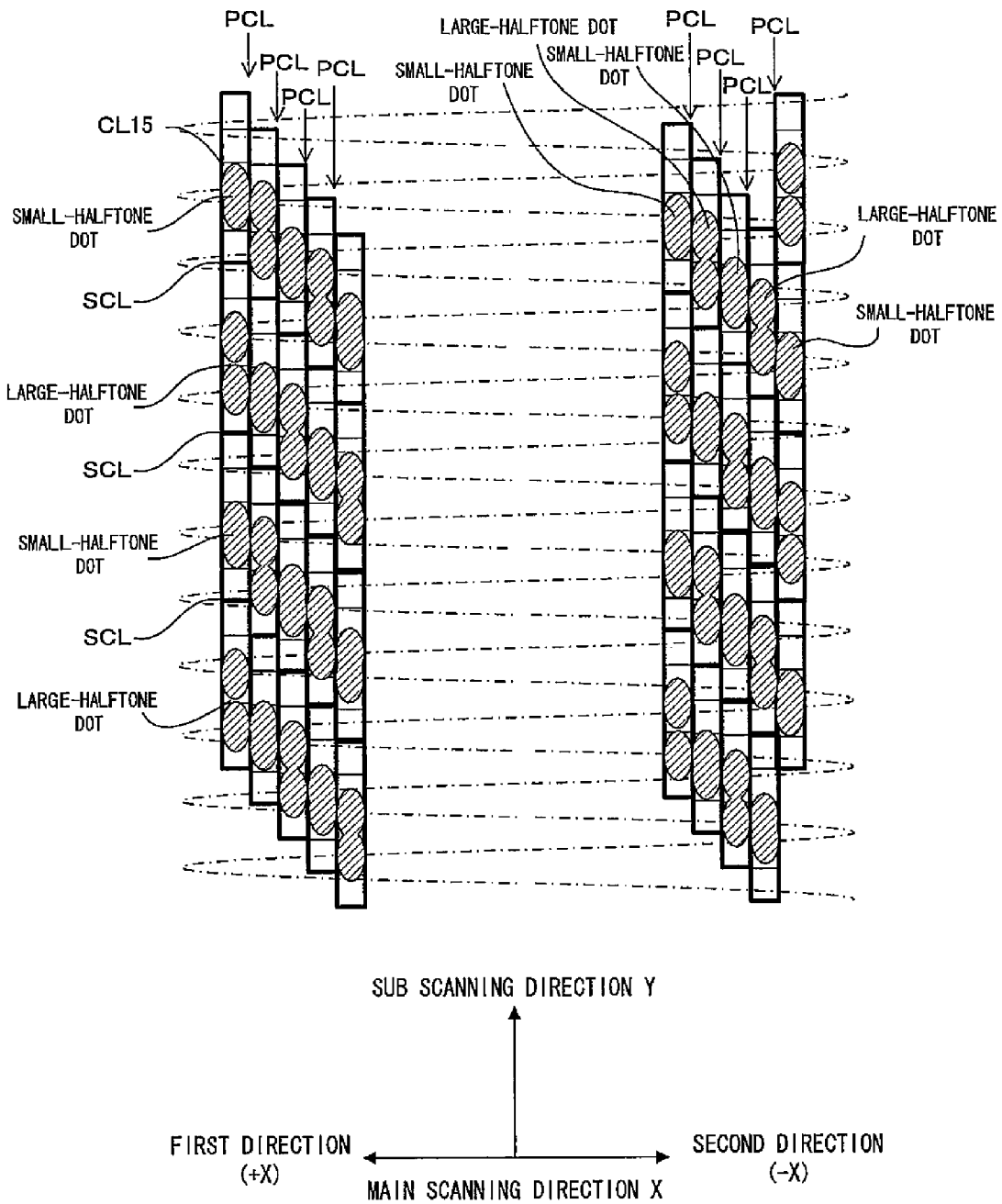
FIG. 18 is a diagram showing the image forming method and image forming apparatus according to the third embodiment of the invention.

Next, description is made on an image forming method and image forming apparatus according to a third embodiment of the invention. It is noted that the embodiment is constituted the same way as the second embodiment except for the cell arrangement. Hence, only the cell arrangement as a feature of the third embodiment is described here, while the description of the other features is dispensed with. FIG. 18 is a diagram showing the image forming method and image forming apparatus according to the third embodiment of the invention. In FIG. 18, a dot-dash line represents the scanning line as the track on which the light beam is scanned; a rectangle in bold solid line represents the 1×5 cell CL15; and an ellipse in solid line (cross-hatched area) represents the area where the pixel-dot is formed by irradiating the beam spot and developing the irradiated area. In the third embodiment as shown in FIG. 18, the 1×5 cells CL15 are arranged in the sub scanning direction Y similarly to the second embodiment. According to the third embodiment, a plurality of cells are contiguously arranged in the main scanning direction X, while the particular contiguous location PCL is provided at each of the plural contiguous locations at which the 1×5 cells CL15 mutually adjoin in the main scanning direction X. Furthermore, the 1×5 cells CL15 mutually adjoining at the particular contiguous location PCL are arranged in a manner that the downstream cell with respect to the first direction (+X) of the main scanning direction X is shifted from the upstream cell by one pixel (an odd number of pixel(s)) in the sub scanning direction Y.

According to the third embodiment, the 1×5 cells CL15, each including the larger-than-three odd number of pixels in the sub scanning direction Y, are arranged in the sub scanning direction Y, as described above. Therefore, in a case where a halftone image of a tone level 2 is formed as shown in FIG. 18, the relation between the pitches of the scanning tracks involved in the pixel-dot formation is inverted at the contiguous location SCL at which the 1×5 cells CL15 mutually adjoin in the sub scanning direction Y, just as in the second embodiment. Specifically, the scanning pitch on the upstream side of the contiguous location SCL in the sub scanning direction Y becomes "wide" (or "narrow"), whereas the scanning pitch on the downstream side becomes "narrow" (or "wide"). In proximity of the opposite ends with respect to the main scanning direction X, therefore, the "large-halftone-dot" and the "small halftone-dot" alternate each other via the contiguous location SCL in the sub scanning direction Y. Thus, the density difference between the halftone images formed in the left-end area and the right-end area is reduced. Accordingly, the favorable tone reproduction may be accomplished by preventing the image defect wherein the density differs between the opposite ends with respect to the main scanning direction X.

According to the third embodiment, the particular contiguous location PCL is further provided at each of the contiguous locations at which the 1×5 cells CL15 mutually adjoin, as described above. Furthermore, the cells mutually adjoining at the particular contiguous location PCL are mutually shifted by one pixel in the sub scanning direction Y. Therefore, in the case where the halftone image of the tone level 2 is formed as shown in FIG. 18, the relation between the pitches of the scanning tracks involved in the pixel-dot formation is inverted at the particular contiguous location PCL. Specifically, the scanning pitch on the upstream side of the particular contiguous location PCL in the main scanning direction X becomes "wide" (or "narrow"), whereas the scanning pitch on the downstream side becomes "narrow" (or "wide"). As a result, the aforesaid "large-halftone-dot" and "small halftone-dot" alternate each other not only in the sub scanning direction Y but also in the main scanning direction X. This is more effective to prevent the phenomenon that the density is progressively decreased from the left-end side (the left end in FIG. 18) toward the right-end side (the right end in FIG. 18). Hence, the favorable tone reproduction may be accomplished by obviating the image defect wherein the density differs between the opposite ends with respect to the main scanning direction X.

Fourth Embodiment

Next, description is made on an image forming method and image forming apparatus according to a fourth embodiment of the invention. It is noted that the embodiment is constituted the same way as the third embodiment except for the cell arrangement. Hence, only the cell arrangement as a feature of the fourth embodiment is described here, while the description of the other features is dispensed with.

Figure 19:
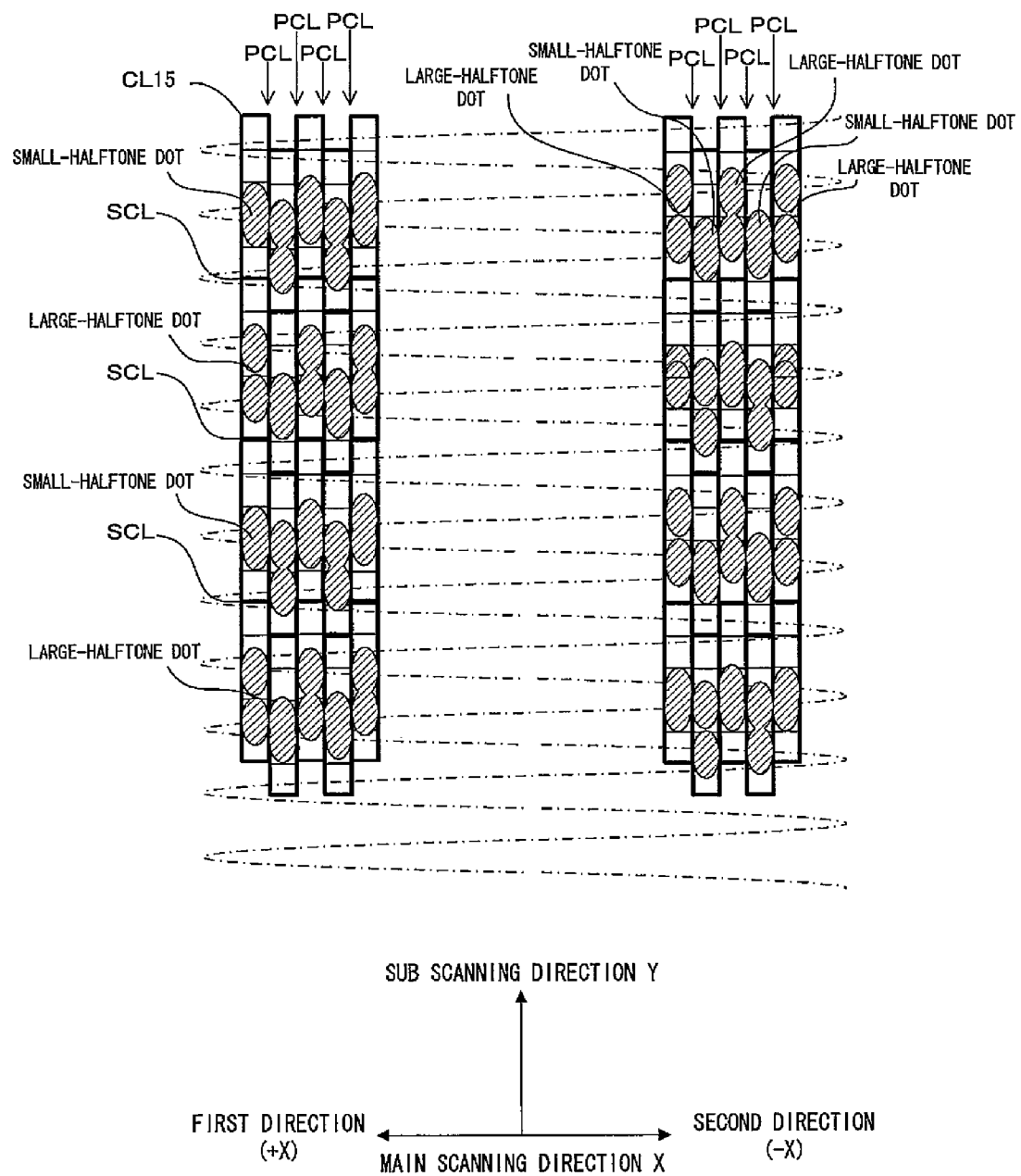
FIG. 19 is a diagram showing the image forming method and image forming apparatus according to the fourth embodiment of the invention.

FIG. 19 is a diagram showing the image forming method and image forming apparatus according to the fourth embodiment of the invention. In FIG. 19, a dot-dash line represents the scanning line as the track on which the light beam is scanned; a rectangle in bold solid line represents the 1×5 cell CL15; and an ellipse in solid line (cross-hatched area) represents the area where the pixel-dot is formed by irradiating the beam spot and developing the irradiated area. In the fourth embodiment as shown in FIG. 19, the 1×5 cells CL15 are arranged in the sub scanning direction Y similarly to the second embodiment. According to the fourth embodiment, a plurality of cells are contiguously arranged in the main scanning direction X, while the particular contiguous location PCL is provided at each of the plural contiguous locations at which the 1×5 cells CL15 mutually adjoin in the main scanning direction X. Furthermore, at each even-numbered particular contiguous location PCL from the upstream side in the first direction (+X) of the main scanning direction X, the downstream cell CL15 with respect to the first direction (+X) of the main scanning direction X is shifted from the upstream cell CL15 by one pixel in the sub scanning direction. At each odd-numbered particular contiguous location PCL from the upstream side in the first direction (+X) of the main scanning direction X, on the other hand, the downstream cell CL15 with respect to the first direction (+X) of the main scanning direction X is shifted from the upstream cell CL15 by one pixel in the opposite direction of the sub scanning direction Y.

According to the fourth embodiment, as described above, the 1×5 cells CL15, each including the larger-than-three odd number of pixels in the sub scanning direction Y, are arranged in the sub scanning direction Y. Therefore, in the case where the halftone image of the tone level 2 is formed as shown in FIG. 19, the relation between the pitches of the scanning tracks involved in the pixel-dot formation is inverted at the contiguous location SCL at which the 1×5 cells CL15 mutually adjoin in the sub scanning direction Y, just as in the second embodiment. Specifically, the scanning pitch on the upstream side of the contiguous location SCL in the sub scanning direction Y becomes "wide" (or "narrow"), whereas the scanning pitch on the downstream side becomes "narrow" (or "wide"). In proximity of the opposite ends with respect to the main scanning direction X, therefore, the "large-halftone-dot" and the "small halftone-dot" alternate each other via the contiguous location SCL in the sub scanning direction Y. Thus, the density difference between the halftone images formed in the left-end area and the right-end area, as seen in FIG. 19, is reduced. Accordingly, the favorable tone reproduction may be accomplished by preventing the image defect wherein the density differs between the opposite ends with respect to the main scanning direction X.

According to the fourth embodiment, as described above, the particular contiguous location PCL is provided at each of the contiguous locations at which the 1×5 cells CL15. Furthermore, at each even-numbered particular contiguous location PCL from the upstream side in the first direction (+X) of the main scanning direction X, the downstream cell CL15 with respect to the first direction (+X) of the main scanning direction X is shifted from the upstream cell CL15 by one pixel in the sub scanning direction. At each odd-numbered particular contiguous location PCL from the upstream side in the first direction (+X) of the main scanning direction X, on the other hand, the downstream cell CL15 with respect to the first direction (+X) of the main scanning direction X is shifted from the upstream cell CL15 by one pixel in the opposite direction of the sub scanning direction Y. As shown in FIG. 19, therefore, the relation between the pitches of the scanning tracks involved in the dot formation is inverted at the particular contiguous location PCL in the case where the halftone image of the tone level 2 is formed. Specifically, the scanning pitch on the upstream side of the particular contiguous location PCL in the main scanning direction X becomes "wide" (or "narrow"), whereas the scanning pitch on the downstream side becomes "narrow" (or "wide"). As a result, the aforesaid "large-halftone-dot" and "small halftone-dot" alternate each other not only in the sub scanning direction Y but also in the main scanning direction X. This is more effective to prevent the phenomenon that the density is progressively decreased from the left-end side toward the right-end side. Hence, the favorable tone reproduction may be accomplished by obviating the image defect wherein the density differs between the opposite ends with respect to the main scanning direction X.

Other Features

It is noted that the invention is not limited to the forgoing embodiments but various modifications may be made thereto so long as such modifications do not deviate from the scope of the invention. While the above second to fourth embodiments use the 1×5 cell CL15 consisting of one pixel in the main scanning direction X and five pixels in the sub scanning direction Y, the type of cell to which the invention may be applied is not limited to this. There may be used, for example, a 5×5 cell CL55 consisting of five pixels in the main scanning direction X and five pixels in the sub scanning direction Y, a 7×7 cell CL77 consisting of seven pixels in the main scanning direction X and seven pixels in the sub scanning direction Y and the like, which will be exemplified by the following examples. In short, if the cell includes a larger-than-three odd number of pixels in the sub scanning direction Y, the invention may be applied to such a cell, because the relation between the pitches of the scanning tracks involved in the pixel-dot formation can be inverted at the contiguous location SCL at which the cells mutually adjoin in the sub scanning direction Y when the halftone image is formed.

According the cell arrangement of the above third and fourth embodiments, the particular contiguous location PCL is provided at each of the contiguous locations at which the cells mutually adjoin in the main scanning direction X. However, the mode of providing the particular contiguous locations PCL is not limited to this. For instance, the particular contiguous locations may be periodically disposed similarly to the above third and fourth embodiments. Otherwise, the particular contiguous locations may be disposed non-periodically. The mode of periodically providing the particular contiguous locations PCL is not limited to the mode of the above third and fourth embodiments, wherein the particular contiguous location is provided at each of the contiguous locations. For example, the particular contiguous location PCL may be provided at every two contiguous locations in the main scanning direction X. In this case, as well, the favorable tone reproduction may be accomplished by obviating the image defect wherein the density differs between the opposite ends with respect to the main scanning direction X.

According to the above third and fourth embodiments, the cells mutually adjoining at the particular contiguous location PCL in the main scanning direction X are mutually shifted by one pixel in the sub scanning direction Y. However, the amount of cell shift in the sub scanning direction Y is not limited to one pixel. The cells may be mutually shifted by, for example, three pixels or five pixels. What is necessary is that the cells mutually adjoining at the particular contiguous location PCL in the main scanning direction are mutually shifted by an odd number of pixel(s) in the sub scanning direction Y. Such a cell arrangement allows the "large-halftone-dot" and the "small halftone-dot" to alternate each other via the particular contiguous location PCL in the main scanning direction X. Hence, the favorable tone reproduction may be accomplished by obviating the image defect wherein the density differs between the opposite ends with respect to the main scanning direction X.

While the foregoing embodiments apply the invention to a color printer of a so-called tandem system, the scope of the invention is not limited to this. The invention may also be applied to printers of a so-called four-cycle system or monochromatic printers for monochromatic printing only, for example.

The foregoing embodiments apply the invention to the image forming apparatus which temporarily forms a color image on an intermediate transfer medium such as an intermediate transfer belt and thereafter, transfers the resultant color image to the sheet S. However, the invention may also be applied to an apparatus which forms the color image by superimposing the individual toner images directly on the sheet.

In the foregoing embodiments, the oscillatory deflection mirror surface 651 is formed using a micromachining technique. However, the method of forming the deflection mirror surface is not limited to this. The invention is applicable to all kinds of image forming apparatuses which use the oscillatory deflection mirror surface for deflecting the light beam thereby scanning the light beam on the latent image carrier.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

The invention will be understood more readily with reference to the following examples; however these examples are intended to illustrate the invention and not to be construed to limit the scope of the invention.

In order to verify the effect of the invention, description is made on the results of comparison between halftone images formed in Examples 1 to 14 of the invention and halftone images formed in Comparative Examples 1 to 4 using the conventional tone reproduction method.

In each of Examples 1 to 14 and Comparative Examples 1 to 4, a Microsoft Word application program was used to form a cyan halftone image having a density of 25% on the opposite ends of a sheet. Measurement was taken on the densities of the opposite end images so as to determine a difference therebetween. The image density was measured by means of a GretagMacbeth Spectrolino spectrophotometer. In the light of measurement errors, an average of the values measured at five points was used as a measurement value.

Examples 1 to 6 and Comparative Examples 1, 2 use the 4×4 cell CL44; Examples 7 to 10 and Comparative Example 3 use the 8×6 cell CL86; and Examples 11 to 14 and Comparative Example 4 use the 8×8 cell CL88. In each example, the cell arrangement is changed. The 4×4 threshold matrix MTX44, an 8×6 threshold matrix MTX86 and an 8×8 threshold matrix MTX88 are used in correspondence to the respective types of cells. FIG. 20A to FIG. 20C show the threshold matrices used in the examples and comparative examples. FIG. 20A shows the 4×4 threshold matrix MTX44; FIG. 20B shows the 8×6 threshold matrix MTX86; and FIG. 20C shows the 8×8 threshold matrix MTX88. All these threshold matrices MTX44, 86, 88 are of the fattening type. As shown in FIG. 20A to FIG. 20C, the threshold matrices are constituted in a manner that the threshold value is increased from the center of the matrix toward outer portions. In the 4×4 threshold matrix MTX44, a threshold value 16 corresponds to the density of 100%. In the 8×6 threshold matrix MTX86, a threshold value 48 corresponds to the density of 100%. In the 8×8 threshold matrix MTX88, a threshold value 64 corresponds to the density of 100%. To form a halftone image having a density of 25%, therefore, the pixel-dots are formed on the pixels corresponding to the threshold values of 4 or less in a case where the 4×4 cell CL44 is used, whereas the pixel-dots are formed on the pixels corresponding to the threshold values of 12 or less in a case where the 8×6 cell CL86 is used. On the other hand, the pixel-dots are formed on the pixels corresponding to the threshold values of 16 or less in a case where the 8×8 cell CL88 is used. A resolution is set to 600×600 dpi (dot per inch) in the case of the 4×4 cell CL44, whereas a resolution is set to 1200×1200 dpi in the cases of the 8×6 cell CL86 and 8×8 cell CL88.

Figure 21:
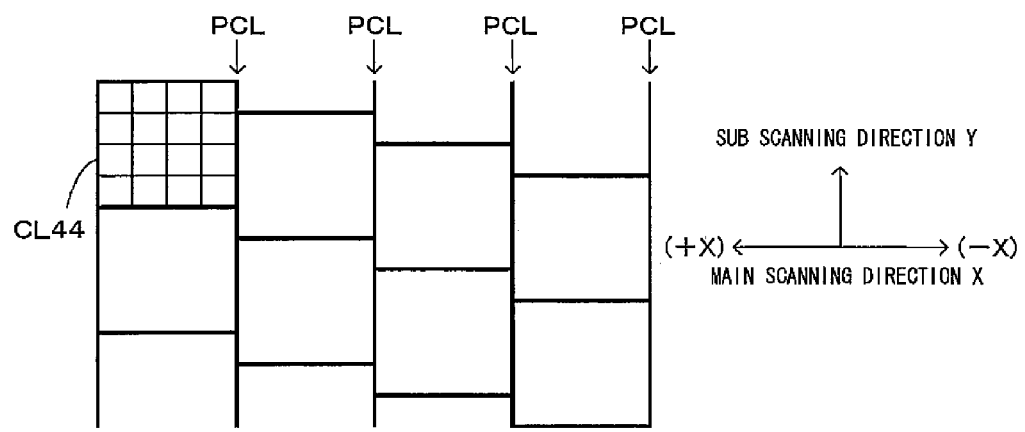
FIG. 21 is a diagram showing a cell arrangement used in Example 1.

FIG. 21 is a diagram showing a cell arrangement used in Example 1. In Example 1, the 4×4 cell CL44 is used and the particular contiguous location PCL is provided at each of the contiguous locations in the main scanning direction X. The cells mutually adjoining at the particular contiguous location PCL are disposed in a manner that the downstream cell with respect to the first direction (+X) of the main scanning direction is shifted from the upstream cell by one pixel in the sub scanning direction Y.

Figure 22:
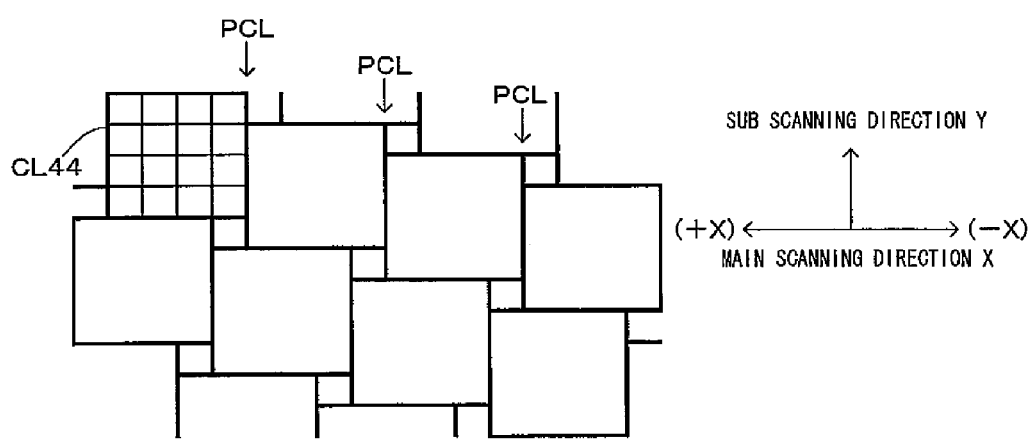
FIG. 22 is a diagram showing a cell arrangement used in Example 2.

FIG. 22 is a diagram showing a cell arrangement used in Example 2. In Example 2, the 4×4 cell CL44 is used and the particular contiguous location PCL is provided at each of the contiguous locations in the main scanning direction X. The cells mutually adjoining at the particular contiguous location PCL are disposed in a manner that the downstream cell with respect to the first direction (+X) of the main scanning direction is shifted from the upstream cell by one pixel in the sub scanning direction Y. Furthermore, the adjoining cells are disposed in a manner that the upstream cell with respect to the sub scanning direction Y is shifted from the downstream cell by one pixel in the first direction (+X) of the main scanning direction.

Figure 23:
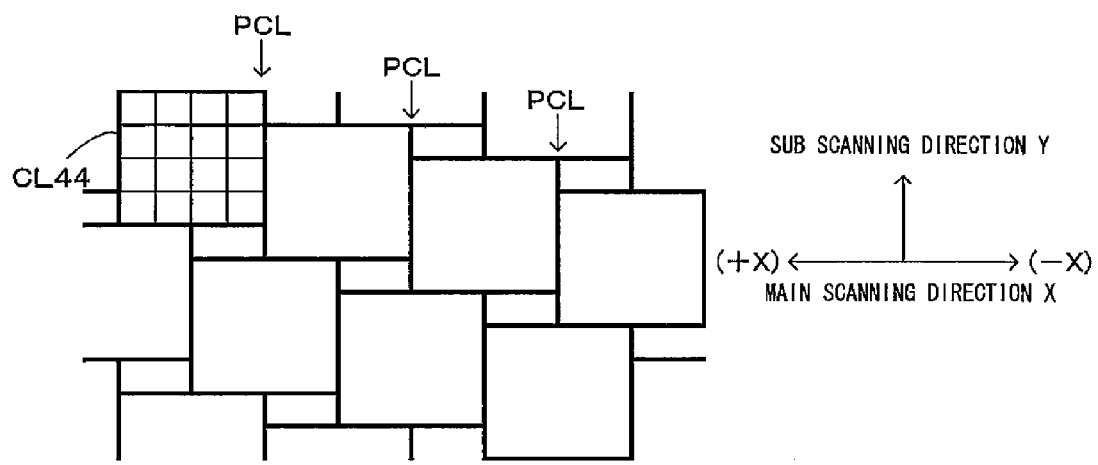
FIG. 23 is a diagram showing a cell arrangement used in Example 3.

FIG. 23 is a diagram showing a cell arrangement used in Example 3. In Example 3, the 4×4 cell CL44 is used and the particular contiguous location PCL is provided at each of the contiguous locations in the main scanning direction X. The cells mutually adjoining at the particular contiguous location PCL are disposed in a manner that the downstream cell with respect to the first direction (+X) of the main scanning direction is shifted from the upstream cell by one pixel in the sub scanning direction Y. Furthermore, the adjoining cells are disposed in a manner that the upstream cell with respect to the sub scanning direction Y is shifted from the downstream cell by two pixels in the first direction (+X) of the main scanning direction.

Figure 24:
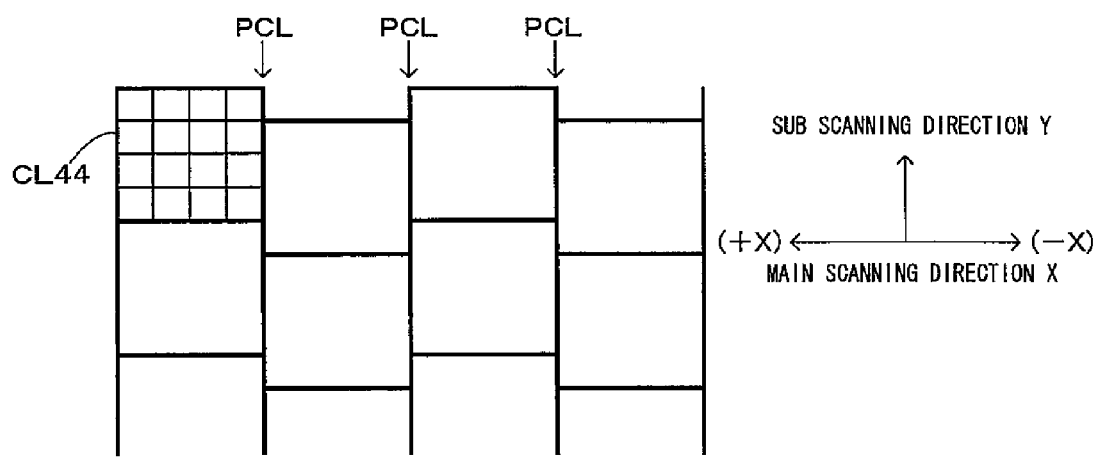
FIG. 24 is a diagram showing a cell arrangement used in Example 4.

FIG. 24 is a diagram showing a cell arrangement used in Example 4. In Example 4, the 4×4 cell CL44 is used and the particular contiguous location PCL is provided at each of the contiguous locations in the main scanning direction X. At each odd-numbered particular contiguous location PCL from the upstream side in the first direction (+X) of the main scanning direction X, the adjoining cells are disposed in a manner that the downstream cell with respect to the first direction (+X) of the main scanning direction is shifted from the upstream cell by one pixel in the sub scanning direction. At each even-numbered particular contiguous location PCL from the upstream side in the first direction (+X) of the main scanning direction, on the other hand, the adjoining cells are disposed in a manner that the downstream cell with respect to the first direction (+X) of the main scanning direction is shifted from the upstream cell by one pixel in the direction opposite to the sub scanning direction.

Figure 25:
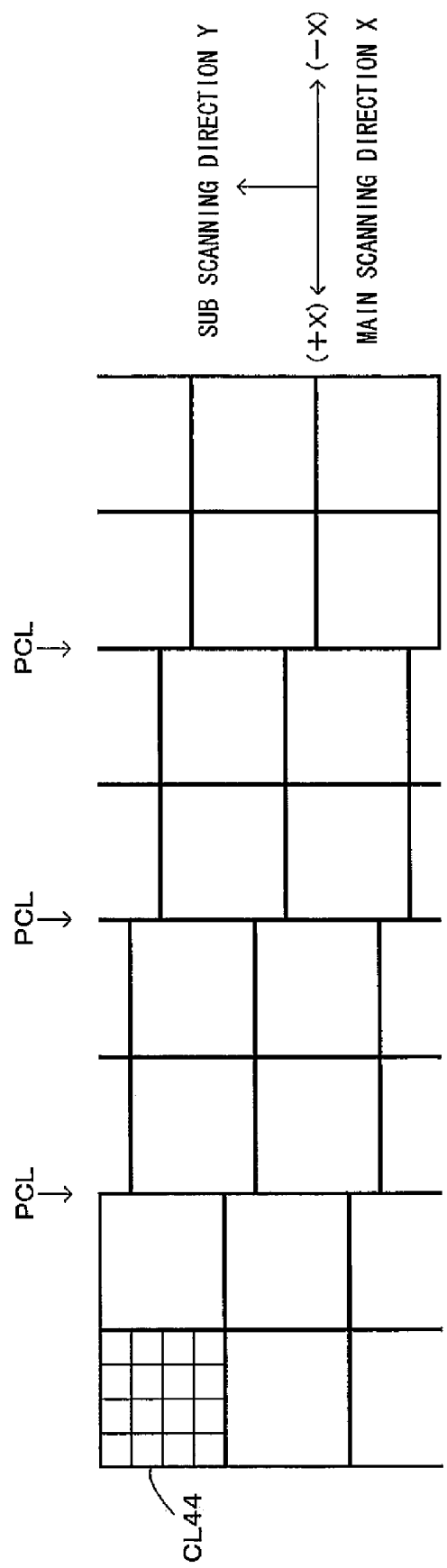
FIG. 25 is a diagram showing a cell arrangement used in Example 5.

FIG. 25 is a diagram showing a cell arrangement used in Example 5. In Example 5, the 4×4 cell CL44 is used and the particular contiguous location PCL is provided at every two contiguous locations in the main scanning direction X. The cells mutually adjoining at the particular contiguous location PCL are disposed in a manner that the downstream cell with respect to the first direction (+X) of the main scanning direction is shifted from the upstream cell by one pixel in the sub scanning direction Y.

Figure 26:
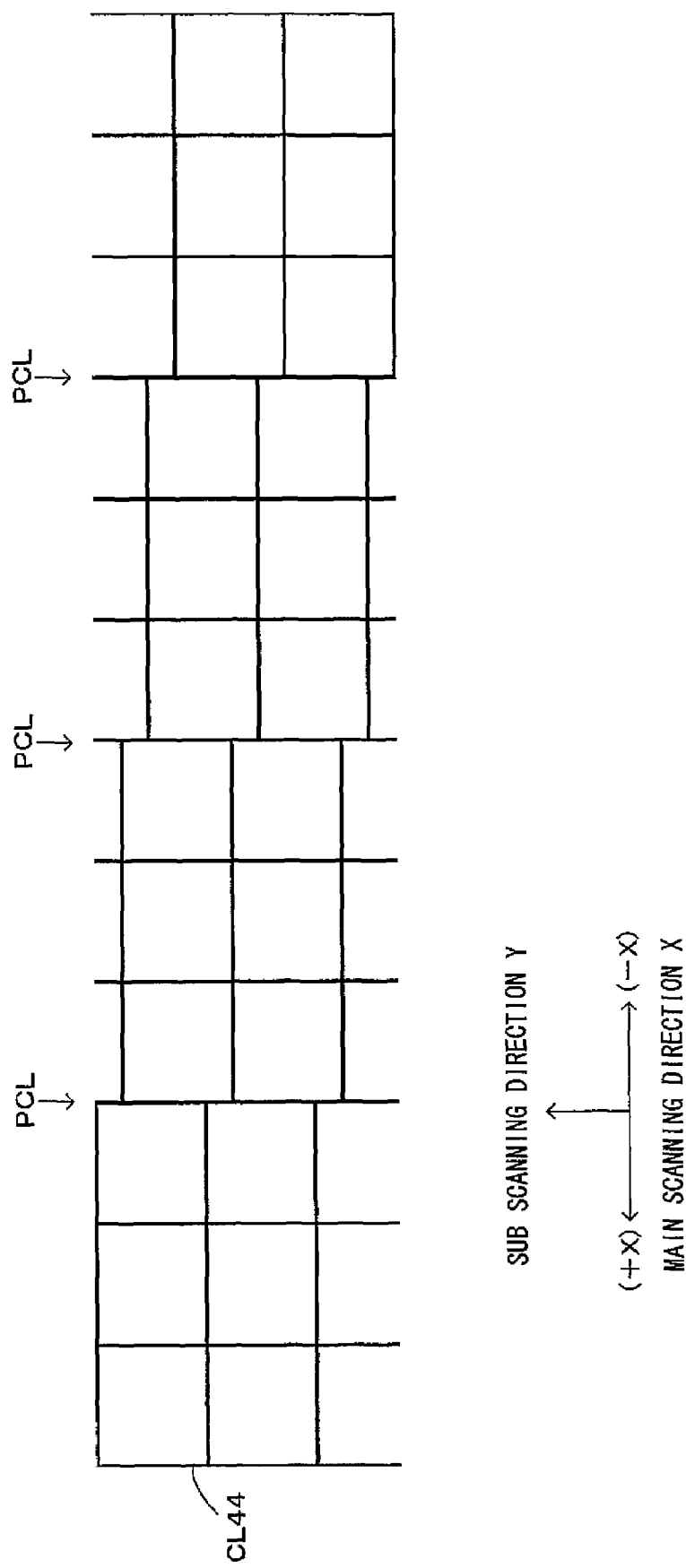
FIG. 26 is a diagram showing a cell arrangement used in Example 6.

FIG. 26 is a diagram showing a cell arrangement used in Example 6. In Example 6, the 4×4 cell CL44 is used and the particular contiguous location PCL is provided at every three contiguous locations in the main scanning direction. The cells mutually adjoining at the particular contiguous location PCL are disposed in a manner that the downstream cell with respect to the first direction (+X) of the main scanning direction is shifted from the upstream cell by one pixel in the sub scanning direction Y.

Figure 27:
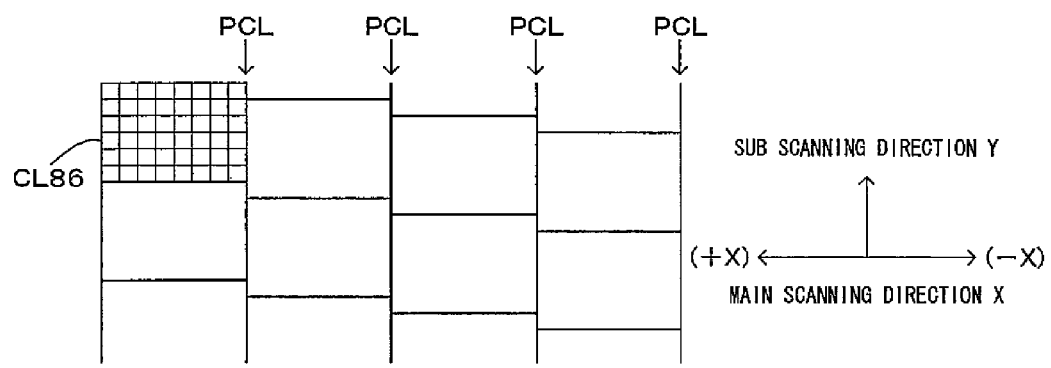
FIG. 27 is a diagram showing a cell arrangement used in Example 7.

FIG. 27 is a diagram showing a cell arrangement used in Example 7. In Example 7, the 8×6 cell CL86 is used and the particular contiguous location PCL is provided at each of the contiguous locations in the main scanning direction X. The cells mutually adjoining at the particular contiguous location PCL are disposed in a manner that the downstream cell with respect to the first direction (+X) of the main scanning direction is shifted from the upstream cell by one pixel in the sub scanning direction Y.

Figure 28:
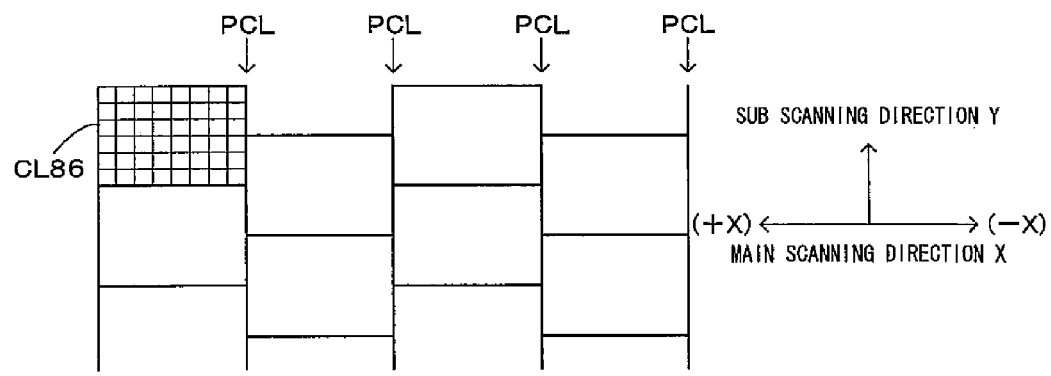
FIG. 28 is a diagram showing a cell arrangement used in Example 8.

FIG. 28 is a diagram showing a cell arrangement used in Example 8. In Example 8, the 8×6 cell CL86 is used and the particular contiguous location PCL is provided at each of the contiguous locations in the main scanning direction X. At each odd-numbered particular contiguous location PCL from the upstream side in the first direction of the main scanning direction, the adjoining cells are disposed in a manner that the downstream cell with respect to the first direction of the main scanning direction is shifted from the upstream cell by three pixels in the sub scanning direction. At each even-numbered particular contiguous location PCL from the upstream side in the first direction of the main scanning direction, on the other hand, the adjoining cells are disposed in a manner that the downstream cell with respect to the first direction of the main scanning direction is shifted from the upstream cell by three pixels in the direction opposite to the sub scanning direction.

Figure 29:
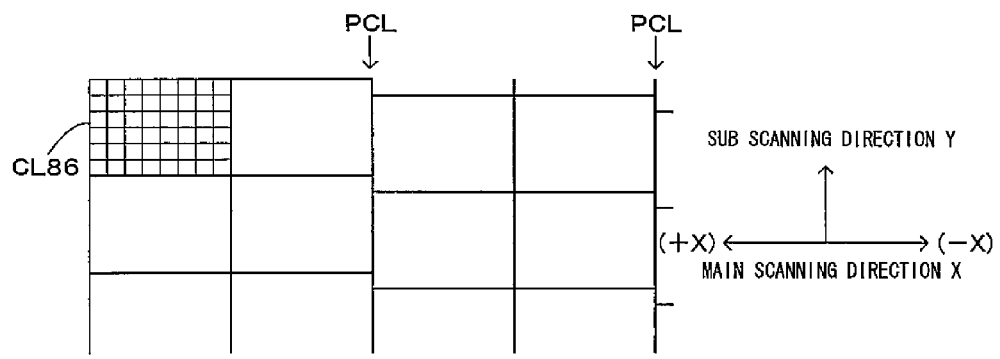
FIG. 29 is a diagram showing a cell arrangement used in Example 9.

FIG. 29 is a diagram showing a cell arrangement used in Example 9. In Example 9, the 8×6 cell CL86 is used and the particular contiguous location PCL is provided at every two contiguous locations in the main scanning direction X. The cells mutually adjoining at the particular contiguous location PCL are disposed in a manner that the downstream cell with respect to the first direction (+X) of the main scanning direction is shifted from the upstream cell by one pixel in the sub scanning direction Y.

Figure 30:
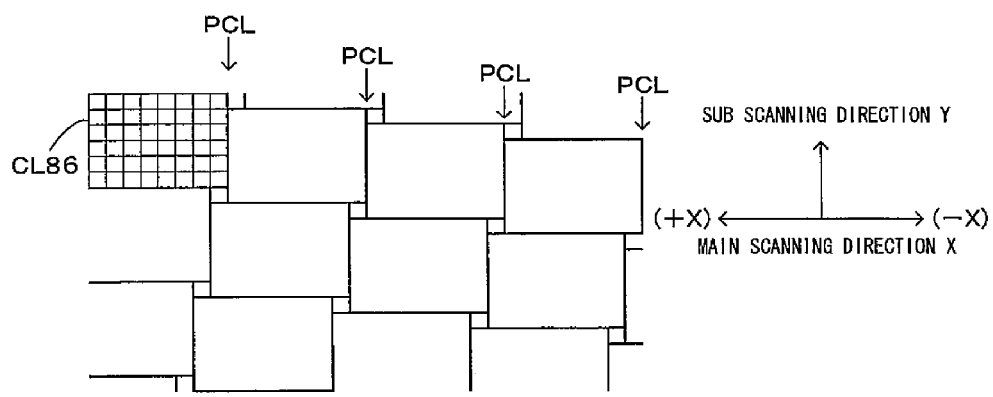
FIG. 30 is a diagram showing a cell arrangement used in Example 10.

FIG. 30 is a diagram showing a cell arrangement used in Example 10. In Example 10, the 8×6 cell CL86 is used and the particular contiguous location PCL is provided at each of the contiguous locations in the main scanning direction X. The cells mutually adjoining at the particular contiguous location PCL are disposed in a manner that the downstream cell with respect to the first direction (+X) of the main scanning direction is shifted from the upstream cell by one pixel in the sub scanning direction Y. Furthermore, the adjoining cells are disposed in a manner that the upstream cell with respect to the sub scanning direction Y is shifted from the downstream cell by one pixel in the first direction (+X) of the main scanning direction.

Figure 31:
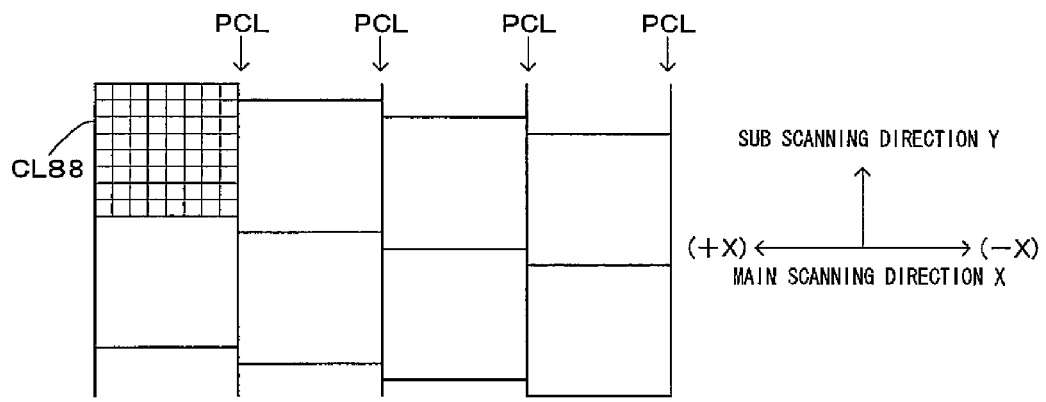
FIG. 31 is a diagram showing a cell arrangement used in Example 11.

FIG. 31 is a diagram showing a cell arrangement used in Example 11. In Example 11, the 8×8 cell CL88 is used and the particular contiguous location PCL is provided at each of the contiguous locations in the main scanning direction X. The cells mutually adjoining at the particular contiguous location PCL are disposed in a manner that the downstream cell with respect to the first direction (+X) of the main scanning direction is shifted from the upstream cell by one pixel in the sub scanning direction Y.

Figure 32:
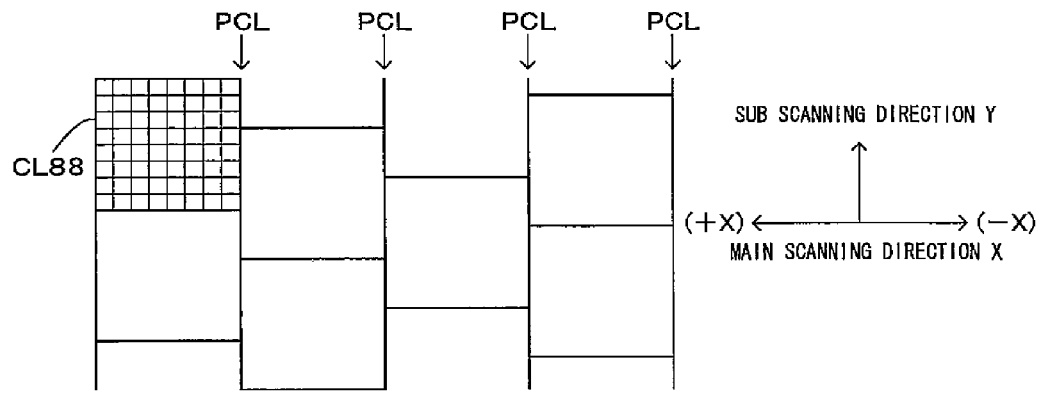
FIG. 32 is a diagram showing a cell arrangement used in Example 12.

FIG. 32 is a diagram showing a cell arrangement used in Example 12. In Example 12, the 8×8 cell CL88 is used and the particular contiguous location PCL is provided at each of the contiguous locations in the main scanning direction. The cells mutually adjoining at the particular contiguous location PCL are disposed in a manner that the downstream cell with respect to the first direction (+X) of the main scanning direction is shifted from the upstream cell by three pixels in the sub scanning direction Y.

Figure 33:
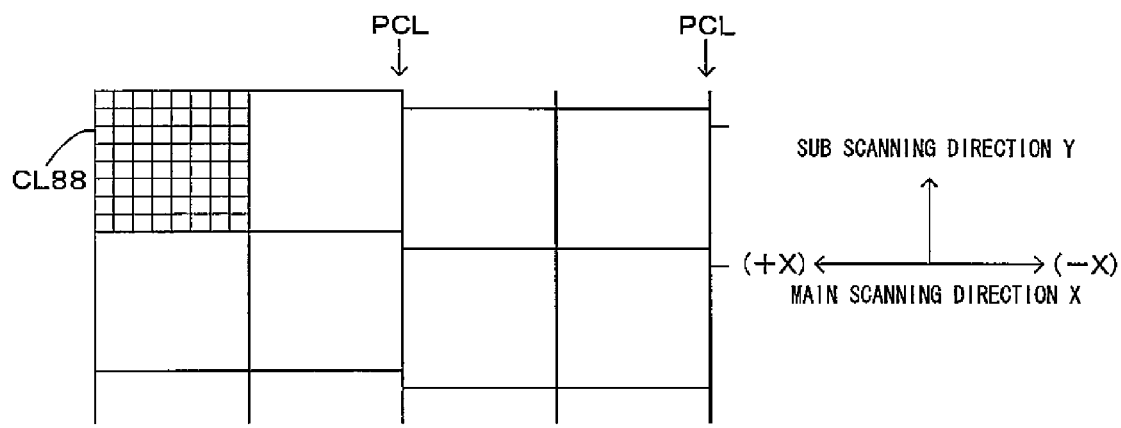
FIG. 33 is a diagram showing a cell arrangement used in Example 13.

FIG. 33 is a diagram showing a cell arrangement used in Example 13. In Example 13, the 8×8 cell CL88 is used and the particular contiguous location PCL is provided at every two contiguous locations in the main scanning direction X. The cells mutually adjoining at the particular contiguous location PCL are disposed in a manner that the downstream cell with respect to the first direction (+X) of the main scanning direction is shifted from the upstream cell by one pixel in the sub scanning direction Y.

Figure 34:
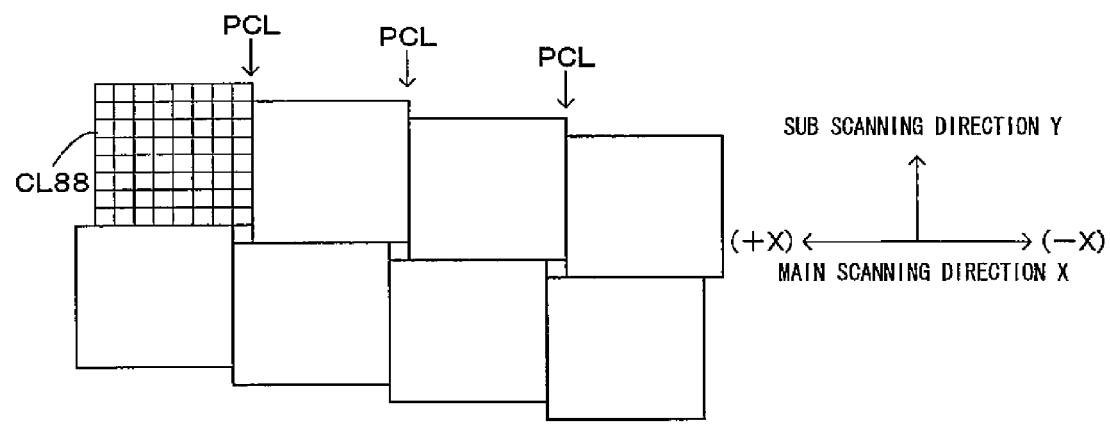
FIG. 34 is a diagram showing a cell arrangement used in Example 14.

FIG. 34 is a diagram showing a cell arrangement used in Example 14. In Example 14, the 8×8 cell CL88 is used and the particular contiguous location PCL is provided at each of the contiguous locations in the main scanning direction X. The cells mutually adjoining at the particular contiguous location PCL are disposed in a manner that the downstream cell with respect to the first direction (+X) of the main scanning direction is shifted from the upstream cell by one pixel in the sub scanning direction Y. Furthermore, the adjoining cells are disposed in a manner that the upstream cell with respect to the sub scanning direction Y is shifted from the downstream cell by one pixel in the first direction (+X) of the main scanning direction.

Figure 35:
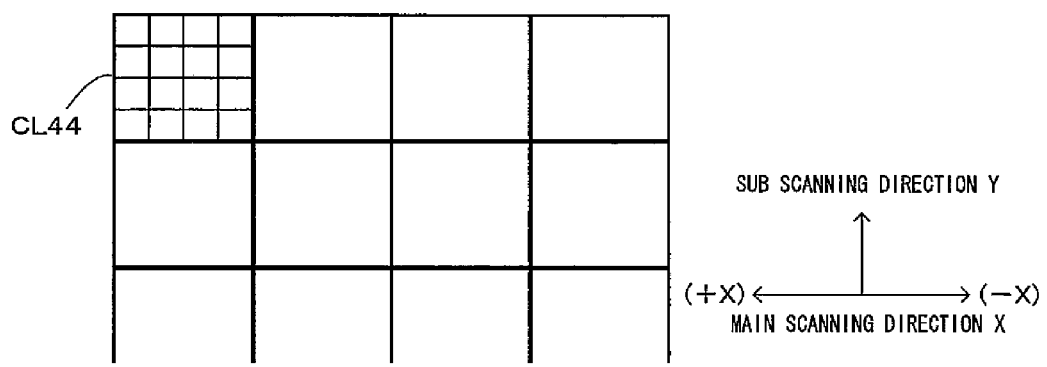
FIG. 35 is a diagram showing a cell arrangement used in Comparative Example 1.

FIG. 35 is a diagram showing a cell arrangement used in Comparative Example 1. In Comparative Example 1, the 4×4 cells CL44 are contiguously arranged in the main scanning direction X, and a respective pair of cells mutually adjoining at the contiguous location in the main scanning direction X are not shifted from each other.

Figure 36:
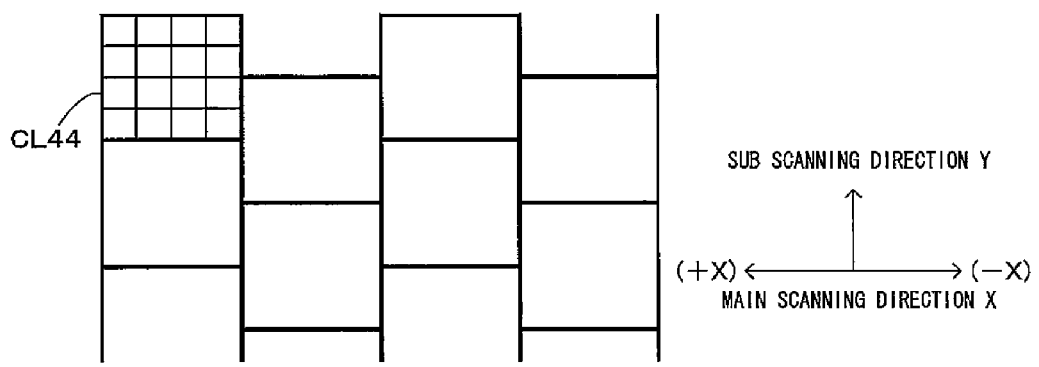
FIG. 36 is a diagram showing a cell arrangement used in Comparative Example 2.

FIG. 36 is a diagram showing a cell arrangement used in Comparative Example 2. In Comparative Example 2, the 4×4 cells CL44 are contiguously arranged in the main scanning direction X. The particular contiguous locations PCL belong to the contiguous locations at which the cells mutually adjoins in the main scanning direction X. At each odd-numbered particular contiguous location PCL from the upstream side in the first direction of the main scanning direction, the adjoining cells are disposed in a manner that the downstream cell with respect to the first direction of the main scanning direction is shifted from the upstream cell by two pixels in the sub scanning direction. At each even-numbered particular contiguous location PCL from the upstream side in the first direction of the main scanning direction, on the other hand, the adjoining cells are disposed in a manner that the downstream cell with respect to the first direction of the main scanning direction is shifted from the upstream cell by two pixels in the direction opposite to the sub scanning direction.

FIG. 37 is a diagram showing a cell arrangement used in Comparative Example 3. In Comparative Example 3, the 8×8 cells CL88 are contiguously arranged in the main scanning direction X, and a respective pair of cells mutually adjoining at the contiguous location in the main scanning direction X are not shifted from each other.

FIG. 38 is a diagram showing a cell arrangement used in Comparative Example 4. In Comparative Example 4, the 8×8 cells CL88 are contiguously arranged in the main scanning direction X, and a respective pair of cells mutually adjoining at the contiguous location in the main scanning direction X are not shifted from each other.

The following table 1 shows the measurement results of the density difference between the halftone images formed on the opposite ends (left and right end) of the sheet according to the above examples and comparative examples. First, the results of Examples 1 to 6 using the 4×4 cells CL44 are compared with the results of Comparative Examples 1, 2 using the 4×4 cells CL44. According to Examples 1 to 6 of the invention, the difference between the right-end and left-end image densities is 0.01 or less based on an absolute value. According to Comparative Examples 1, 2 using the conventional tone reproduction method, on the other hand, the difference between the right-end and the left-end image densities is 0.06 or more based on the absolute value. This indicates that Examples 1 to 6 achieve the smaller difference between the right-end and left-end image densities as compared with Comparative Examples 1, 2. It is thus confirmed that Examples 1 to 6 of the invention are adapted to provide the favorable tone reproduction by obviating the image defect wherein the density differs between the opposite ends with respect to the main scanning direction.

Next, the results of Examples 7 to 10 using the 8×6 cells CL86 are compared with the results of Comparative Example 3 using the 8×6 cells CL86. According to Examples 7 to 10 of the invention, the difference between the right-end and left-end image densities is 0.01 or less based on the absolute value. According to Comparative Example 3 using the conventional tone reproduction method, on the other hand, the density difference is 0.05 based on the absolute value. This indicates that Examples 7 to 10 achieve the smaller difference between the right-end and left-end image densities as compared with Comparative Example 3. It is thus confirmed that Examples 7 to 10 of the invention are adapted to provide the favorable tone reproduction by obviating the image defect wherein the density differs between the opposite ends with respect to the main scanning direction.

Next, the results of Examples 11 to 14 using the 8×8 cells CL88 are compared with the results of Comparative Example 4 using the 8×8 cells CL88. According to Examples 11 to 14 of the invention, the difference between the right-end and left-end image densities is 0.01 or less based on the absolute value. According to Comparative Example 4 using the conventional tone reproduction method, on the other hand, the density difference is 0.06 based on the absolute value. This indicates that Examples 11 to 14 achieve the smaller difference between the right-end and left-end image densities as compared with Comparative Example 4. It is thus confirmed that Examples 11 to 14 of the invention are adapted to provide the favorable tone reproduction by obviating the image defect wherein the density differs between the opposite ends with respect to the main scanning direction.

TABLE 1

| | | DENSITY (LEFT) | DENSITY (RIGHT) | DIFFERENCE |
|---|---|---|---|---|
| 4 × 4 CELL | EXAMPLE 1 | 0.37 | 0.38 | −0.01 |
| | EXAMPLE 2 | 0.35 | 0.36 | −0.01 |
| | EXAMPLE 3 | 0.34 | 0.33 | 0.01 |
| | EXAMPLE 4 | 0.38 | 0.39 | −0.01 |
| | EXAMPLE 5 | 0.38 | 0.37 | 0.01 |
| | EXAMPLE 6 | 0.37 | 0.37 | 0 |
| | COMPARATIVE EXAMPLE 1 | 0.41 | 0.34 | 0.07 |
| | COMPARATIVE EXAMPLE 2 | 0.4 | 0.34 | 0.06 |
| 8 × 6 CELL | EXAMPLE 7 | 0.36 | 0.36 | 0 |
| | EXAMPLE 8 | 0.37 | 0.36 | 0.01 |
| | EXAMPLE 9 | 0.37 | 0.36 | 0.01 |
| | EXAMPLE 10 | 0.35 | 0.36 | −0.01 |
| | COMPARATIVE EXAMPLE 3 | 0.4 | 0.35 | 0.05 |
| 8 × 8 CELL | EXAMPLE 11 | 0.34 | 0.35 | −0.01 |
| | EXAMPLE 12 | 0.35 | 0.35 | 0 |
| | EXAMPLE 13 | 0.35 | 0.35 | 0 |
| | EXAMPLE 14 | 0.37 | 0.36 | 0.01 |
| | COMPARATIVE EXAMPLE 4 | 0.39 | 0.33 | 0.06 |

In order to verify the effect of the invention, description is made on the results of comparison between halftone images formed in Examples 15, 16 of the invention and halftone images formed in Comparative Example 5 using the conventional tone reproduction method.

FIGS. 39A to 39C are diagrams showing threshold matrices corresponding to cells used in Examples 15, 16 and Comparative Example 5. Example 15 uses a 5×5 cell consisting of five pixels in the main scanning direction X and five pixels (a larger-than-three odd number of pixels) in the sub scanning direction Y. The example reproduces the halftone by applying a fattening type threshold matrix MTX55, shown in FIG. 39A, to the 5×5 cell. Therefore, as the set value (set density) of the density of an image to be formed is increased from 0%, the number of pixels of the 5×5 cell, which are subjected to light exposure and development for pixel-dot formation, is proportionally increased so that the halftone-dot grows from the center of the cell CL55. In a case where the density of the image to be formed is set to 100%, the pixel-dots are formed on all the pixels having threshold values of 25 or less.

Example 16 uses a 7×7 cell CL77 consisting of seven pixels in the main scanning direction X and seven pixels (a larger-than-three odd number of pixels) in the sub scanning direction Y. The example reproduces the halftone by applying a fattening type threshold matrix MTX77, shown in FIG. 39B, to the 7×7 cell. Therefore, as the set value (set density) of the density of an image to be formed is increased from 0%, the number of pixels of the 7×7 cell CL77, which are subjected to light exposure and development for pixel-dot formation, is proportionally increased so that the halftone-dot grows from the center of the cell CL77. In a case where the density of the image to be formed is set to 100%, the pixel-dots are formed on all the pixels having threshold values of 49 or less.

Comparative Example 5 uses a 6×6 cell CL66 consisting of six pixels in the main scanning direction X and six pixels (an even number of pixels) in the sub scanning direction Y. The example reproduces the halftone by applying a fattening type threshold matrix MTX66, shown in FIG. 39C, to the 6×6 cell. Therefore, as the set value (set density) of the density of an image to be formed is increased from 0%, the number of pixels of the 6×6 cell CL66, which are subjected to light exposure and development for pixel-dot formation, is proportionally increased so that the halftone-dot grows from the center of the cell CL66. In a case where the density of the image to be formed is set to 100%, the pixel-dots are formed on all the pixels having threshold values of 36 or less.

In each of Examples 15, 16 and Comparative Example 5, the Microsoft Word application program was used to form a cyan halftone image having predetermined densities (gradation image) on the opposite ends of a sheet. Measurement was taken on the densities of the opposite end images so as to determine a difference therebetween. In each of Examples 15, 16 and Comparative Example 5, the halftone image (gradation image) was formed with the densities set to 10%, 20%, 30%, 40% and 50%. The image density was measured by means of the Gretagacbeth Spectrolino spectrophotometer. In the light of measurement errors, an average of the values measured at five points was used as a measurement value. The images were formed at a resolution of 600 dpi in both of the main scanning direction X and the sub scanning direction Y.

Figure 40:
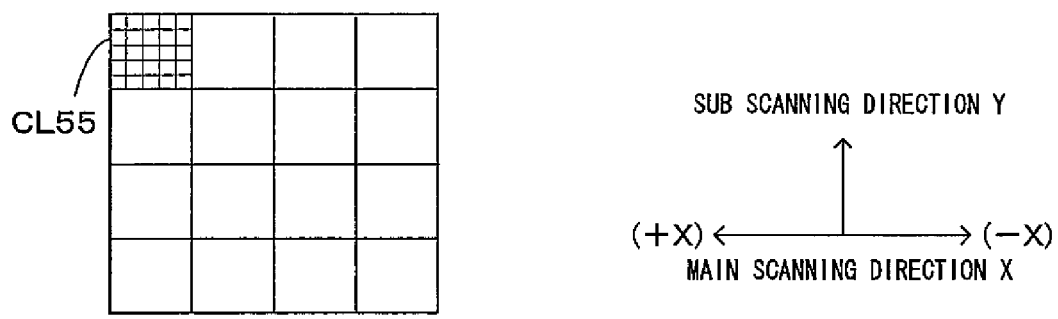
FIG. 40 is a diagram showing a cell arrangement used in Example 15.
Figure 41:
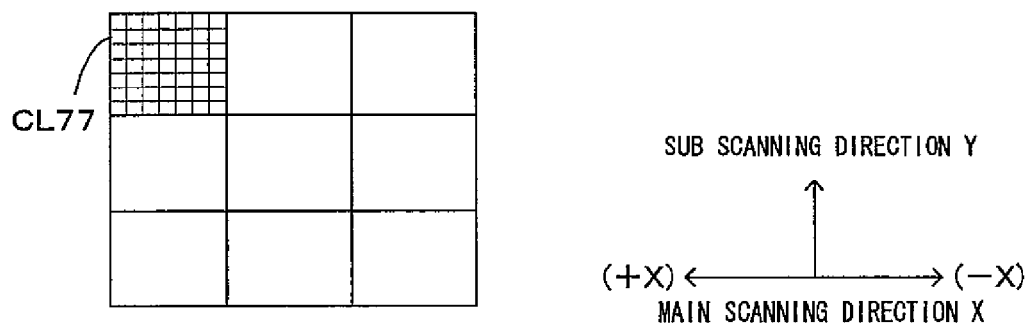
FIG. 41 is a diagram showing a cell arrangement used in Example 16.
Figure 42:
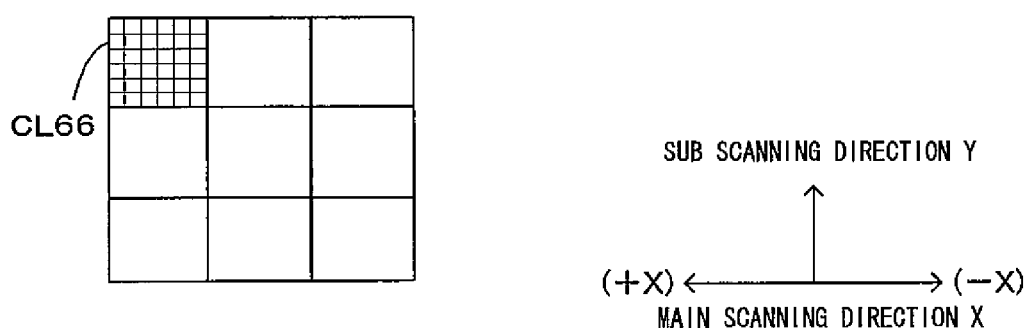
FIG. 42 is a diagram showing a cell arrangement used in Comparative Example 5.

FIG. 40 is a diagram showing a cell arrangement used in Example 15. In Example 15, the 5×5 cells CL55 are contiguously arranged in the main scanning direction X and the sub scanning direction Y FIG. 41 is a diagram showing a cell arrangement used in Example 16. In Example 16, the 7×7 cells CL77 are contiguously arranged in the main scanning direction X and the sub scanning direction Y FIG. 42 is a diagram showing a cell arrangement used in Comparative Example 5. In Comparative Example 5, the 6×6 cells CL66 are contiguously arranged in the main scanning direction X and the sub scanning direction Y.

Figure 43:
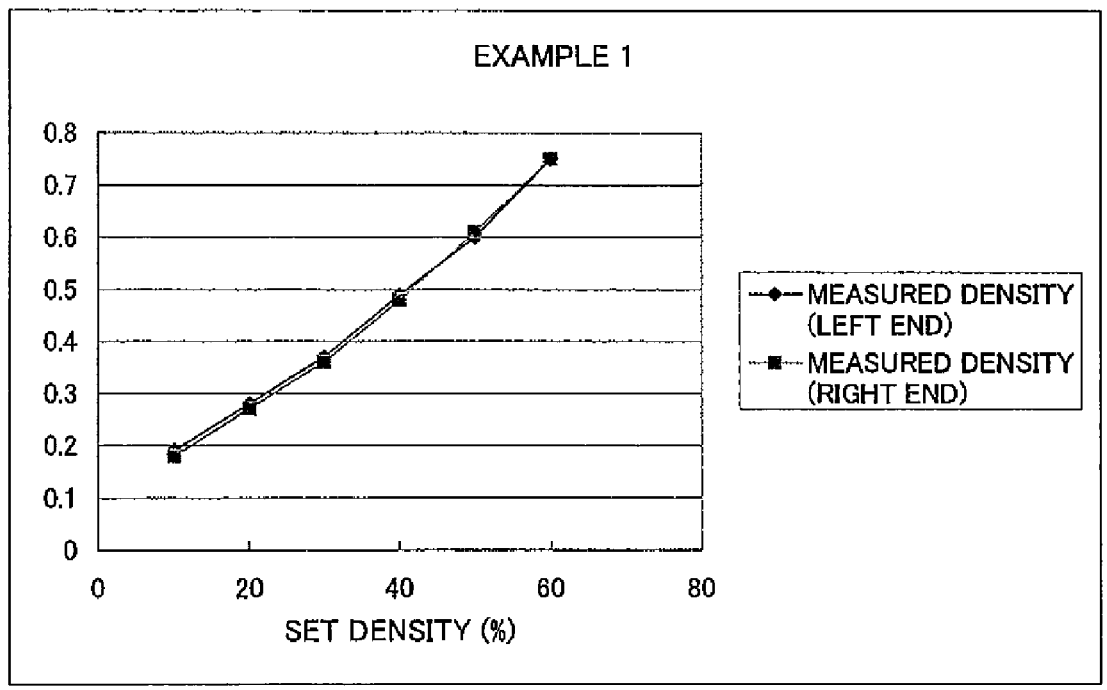
FIG. 43 is a diagram graphically showing the results listed in Table 2.

Table 2 shows the measurement results of the densities of the halftone images (gradation images) of Example 15, which were formed on the transversely opposite ends of a sheet (the opposite ends with respect to the main scanning direction). The halftone images were formed at the individual set densities (%). FIG. 43 graphically shows the results listed in Table 2, plotting the set density (%) of the halftone image on the abscissa and the measured density of the halftone image on the ordinate, the images formed on the transversely opposite ends of the sheet at the individual set densities (%).

TABLE 2

| SET DENSITY (%) | MEASURED DENSITY (LEFT END) | MEASURED DENSITY (RIGHT END) |
| --- | --- | --- |
| 10 | 0.19 | 0.18 |
| 20 | 0.28 | 0.27 |
| 30 | 0.37 | 0.36 |
| 40 | 0.49 | 0.48 |
| 50 | 0.6 | 0.61 |
| 60 | 0.75 | 0.75 |

Figure 44:
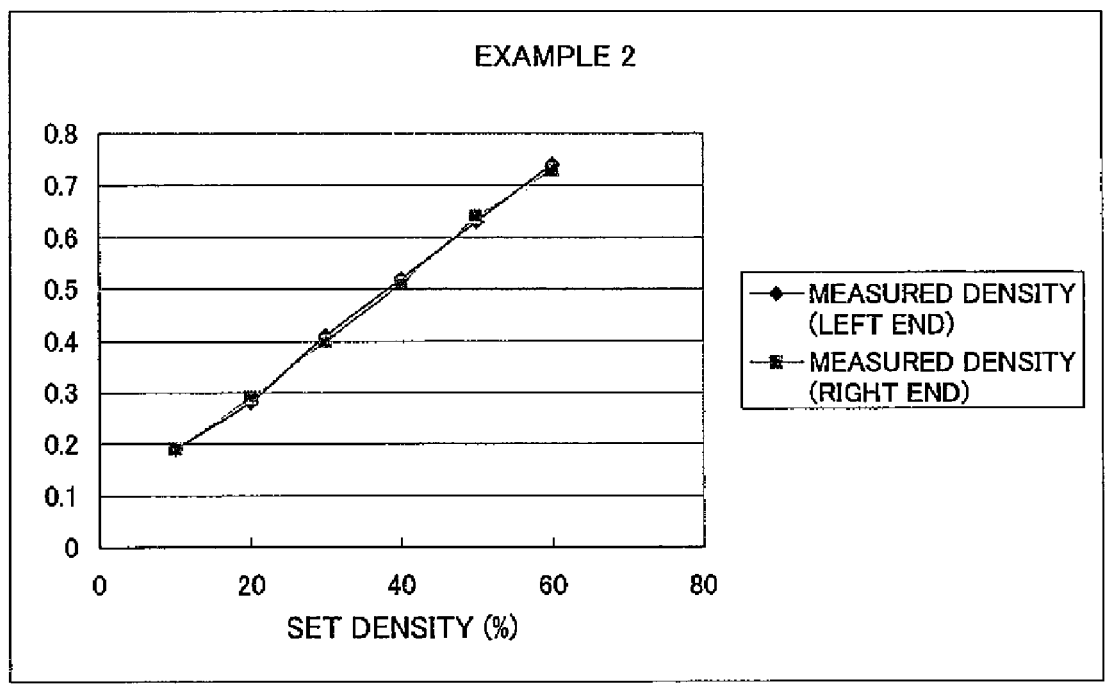
FIG. 44 is diagram graphically showing the results listed in Table 2.

Table 3 shows the measurement results of the halftone images (gradation images) of Example 16, which were formed on the transversely opposite ends of the sheet (the opposite ends with respect to the main scanning direction). The halftone images were formed at the individual set densities (%). FIG. 44 graphically shows the results listed in Table 2, plotting the set density (%) of the halftone image on the abscissa and the measured density of the halftone image on the ordinate, the images formed on the transversely opposite ends of the sheet at the individual set densities (%).

TABLE 3

| SET DENSITY (%) | MEASURED DENSITY (LEFT END) | MEASURED DENSITY (RIGHT END) |
| --- | --- | --- |
| 10 | 0.19 | 0.19 |
| 20 | 0.28 | 0.29 |
| 30 | 0.41 | 0.4 |
| 40 | 0.52 | 0.51 |
| 50 | 0.63 | 0.64 |
| 60 | 0.74 | 0.73 |

Table 4 shows the measurement results of the halftone images (gradation images) of Comparative Example 5, which were formed on the transversely opposite ends of the sheet (the opposite ends with respect to the main scanning direction). The halftone images were formed at the individual set densities (%). FIG. 45 graphically shows the results listed in Table 4, plotting the set density (%) of the halftone image on the abscissa and the measured density of the halftone image on the ordinate, the images formed on the transversely opposite ends of the sheet at the individual set densities (%).

TABLE 4

| SET DENSITY (%) | MEASURED DENSITY (LEFT END) | MEASURED DENSITY (RIGHT END) |
| --- | --- | --- |
| 10 | 0.19 | 0.19 |
| 20 | 0.27 | 0.24 |
| 30 | 0.37 | 0.33 |
| 40 | 0.49 | 0.44 |
| 50 | 0.63 | 0.58 |
| 60 | 0.75 | 0.73 |

The following fact is apparent from FIG. 45. In the comparative example wherein the halftone images are formed using the conventional tone reproduction method, the halftone images formed on the left end of the sheet have higher measured densities than the halftone images formed on the right end with respect to the individual set densities of 20% to 60%. In contrast, FIG. 43 and FIG. 44 corresponding to Examples 15 and 16 as the embodiments of the invention indicate that the measured densities of the halftone images formed on the left end of the sheet are substantially equal to those of the halftone images formed on the right end. In short, Examples 15 and 16 of the invention achieve the smaller difference between the right-end and the left-end image densities. It is thus confirmed that Examples 15 and 16 of the invention accomplish the favorable tone reproduction by obviating the image defect wherein the density differs between the opposite ends with respect to the main scanning direction X.

What is claimed is:

1. An image forming method using an image forming apparatus comprising: an oscillating deflect mirror which scans a beam in a first direction; a latent image carrier which moves in a second direction perpendicular or substantially perpendicular to the first direction, the method comprising:
   halftoning for a tone reproduction in the use of a cell consisting of plural pixels; and
   scanning the beam on the latent image carrier reciprocally in the first direction by the oscillating deflect mirror, wherein
   the cell includes a four or larger-than-four even number of pixels in the second direction,
   two cells arranged adjacently in the first direction are shifted in the second direction, and
   plural pairs of the two cells are arranged periodically in the first direction.

2. An image forming method according to claim 1, wherein the two cells are shifted by half of the number of pixels included in the cell in the second direction.

3. An image forming method according to claim 1, wherein the cell includes an eight or larger-than-eight number of pixels in the second direction.

4. An image forming apparatus comprising:
   an oscillating deflect mirror which scans a beam in a first direction;

a latent image carrier which moves in a second direction perpendicular or substantially perpendicular to the first direction; and a controller which executes a tone reproduction in the use of a cell consisting of plural pixels, wherein the deflect mirror scans the beam on the latent image carrier reciprocally in the first direction, the cell includes a four or larger-than-four even number of pixels in the second direction, two cells arranged adjacently in the first direction are shifted in the second direction, and plural pairs of the two cells are arranged periodically in the first direction.

5. An image forming method using an image forming apparatus comprising: an oscillating deflect mirror which scans a beam in a first direction; a latent image carrier which moves in a second direction perpendicular or substantially perpendicular to the first direction, the method comprising:

halftoning for a tone reproduction in the use of a cell consisting of plural pixels; and scanning the beam on the latent image carrier reciprocally in the first direction by the oscillating deflect mirror, wherein the cell includes a four or larger-than-four even number of pixels in the second direction, a first cell, a second cell, a third cell, and a fourth cell are arranged adjacently in this order in the first direction, the first cell and the third cell are arranged at the same position in the second direction, the second cell and the fourth cell are arranged at the same position in the second direction, and each of the first and third cells are shifted to each of the second and fourth cells.

6. An image forming apparatus comprising:

an oscillating deflect mirror which scans a beam in a first direction;

a latent image carrier which moves in a second direction perpendicular or substantially perpendicular to the first direction; and a controller which executes a tone reproduction in the use of a cell consisting of plural pixels, wherein the deflect mirror scans the beam on the latent image carrier reciprocally in the first direction, the cell includes a four or larger-than-four even number of pixels in the second direction, a first cell, a second cell, a third cell, and a fourth cell are arranged adjacently in this order in the first direction, the first cell and the third cell are arranged at the same position in the second direction, the second cell and the fourth cell are arranged at the same position in the second direction, and each of the first and third cells are shifted to each of the second and fourth cells.

* * * * *